(12) United States Patent
Hwang et al.

(10) Patent No.: US 10,189,133 B2
(45) Date of Patent: Jan. 29, 2019

(54) MEASUREMENT, CALIBRATION AND COMPENSATION SYSTEM AND METHOD FOR MACHINE TOOL

(71) Applicant: NATIONAL CHUNG SHAN INSTITUTE OF SCIENCE AND TECHNOLOGY, Taoyuan (TW)

(72) Inventors: Yi-Yuh Hwang, Taipei (TW); Wei-Guo Chang, Taoyuan (TW); Li-Chung Liu, Taoyuan (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 154 days.

(21) Appl. No.: 15/388,496

(22) Filed: Dec. 22, 2016

(65) Prior Publication Data

US 2018/0178339 A1 Jun. 28, 2018

(51) Int. Cl.
| | |
|---|---|
| *B23Q 11/00* | (2006.01) |
| *B23Q 17/24* | (2006.01) |
| *G01B 11/00* | (2006.01) |
| *G05B 19/402* | (2006.01) |

(52) U.S. Cl.
CPC ...... *B23Q 11/0007* (2013.01); *B23Q 17/2428* (2013.01); *B23Q 17/2495* (2013.01); *G01B 11/002* (2013.01); *G05B 19/402* (2013.01); *G05B 2219/37582* (2013.01)

(58) Field of Classification Search
CPC ............ B23Q 11/0007; B23Q 17/2471; G01B 11/002; G05B 19/402; G05B 2219/37582
USPC ......................................................... 700/166
See application file for complete search history.

(56) References Cited

U.S. PATENT DOCUMENTS

| | | | |
|---|---|---|---|
| 7,715,016 B2 * | 5/2010 | Hwang ................ | G01B 11/002 345/166 |
| 8,330,721 B2 * | 12/2012 | Grot ....................... | G06F 3/0317 345/166 |
| 2013/0235389 A1 * | 9/2013 | Hwang .................... | G01D 5/34 356/614 |

* cited by examiner

*Primary Examiner* — Ziaul Karim
(74) *Attorney, Agent, or Firm* — WPAT, PC

(57) ABSTRACT

A measurement, calibration and compensation system for machine tool includes a first positioning base; two first speckle image sensors for sensing speckle positions of an object holding unit at a first XY plane and a first XZ plane of the first positioning base before and after the machine tool is started for machining; a second positioning base; two second speckle image sensors for sensing speckle positions of a cutter holding unit at a second XY plane and a second YZ plane of the second positioning base before and after the machine tool is started for machining. Thus, the thermal expansion at all axes of the machine tool can be measured in a simplified and low-cost way, and the absolute positioning coordinates of all axes of the machine tool can be calibrated in real time to avoid reduced positioning accuracy due to the thermal expansion of the multi-axis machine tool.

10 Claims, 9 Drawing Sheets

MEASUREMENT, CALIBRATION AND COMPENSATION SYSTEM AND METHOD FOR MACHINE TOOL

FIELD OF THE INVENTION

The present invention relates to a measurement, calibration and compensation system and method for machine tool, and more particularly, to a measurement, calibration and compensation system and method for machine tool that uses a simplified and low-cost way with good thermal deformation calibration accuracy to directly precisely measure the thermal expansion amounts at all axes of a machine tool, and the absolute positioning coordinates of all axes of the machine tool can be calibrated in real time to avoid reduced positioning accuracy due to the thermal expansion of the multi-axis machine tool.

BACKGROUND OF THE INVENTION

The heat produced by a machine tool during operation thereof over a long period of time and the changes in the environmental temperature will lead to thermal deformation of the machine tool as a result of thermal effect. In this case, the relative position between the cutter and the workpiece on the machine tool will change to cause errors in the dimensions and shape of the workpiece being machined and accordingly, lowered machining accuracy. Generally, 40%~70% of the machining errors are attributable to the thermal deformation of the machine tool. Therefore, the thermal behavior of the machine tool is considered an important index for the machining accuracy and stability thereof. A repeatedly and stably occurred thermal behavior indicates the machine tool can maintain good machining quality over a long duration. On the other hand, a machine tool having extremely variable thermal behavior will have trouble ensuring its machining quality. Therefore, many manufacturers deem their solutions for heat-induced errors, such as the thereto-friendly technology and the heat source cooling and suppressing technology, a technical symbol for high machining accuracy and high quality stability.

The method used by domestic machine tool-related manufacturers to solve the problem of thermal deformation of machine tool is to develop computerized numeric control (CNC) system-based thermal deformation control technology. This thermal deformation control technology includes (1) the mounting of temperature sensors on the machine body at positions with relatively significant temperature variation, which can be measured with an infrared thermography, to capture temperature changes of the machine tool; (2) the setup of a three-dimensional measuring system for measuring and recording the deformation of the machine tool caused by temperature rise; (3) the use of temperature data and thermal deformation data to construct a machine tool thermal deformation model; and (4) the testing of the machine tool thermal deformation model and temperature rise compensation.

According to the CNC system-based thermal deformation control technology, the temperature variation amount of the machine tool is measured and calculated using the built-in software of the machine tool thermal deformation model to derive the real-time thermal deformation amount of the machine tool, which is then used as a thermal compensation and calibration displacement amount for the machining spindle. In the development of the thermal deformation model software, since the sampling range of the machine tool heat source and the environmental temperature is limited, a big change in the heating feature of the built-in motor of the machine tool or a big change in the environmental temperature will cause errors in the initially set calibration software calculation when the machine tool has been used over a long period of time, so that the working accuracy and the machining stability of the machine tool will reduce.

Many methods have been adopted by foreign manufacturers to reduce the thermal deformation amount of the machine tool. These methods include (1) the designing of a machine body structure with thermal symmetry and thermal balance, so that the occurrence of the machine tool thermal deformation induced errors has symmetry and is controllable; (2) the adoption of thermo-friendly machine body to effectively reduce the thermal deform amount of the machine body of the machine tool; (3) the adoption of multi-passage zero-heat source cooling technology to effectively reduce the temperature variation amount of the heat source; and (4) the measurement of hot points on the machine body and the compensation for thermal deformation. The above-mentioned technologies have their respective functions and must be fully implemented to meet the preset specifications, and they also involve very high complexity, difficulty and manufacturing cost.

Therefore, it is desirable to develop a measurement, calibration and compensation system and method for machine tool, so that the thermal expansion amounts at all axes of a machine tool can be directly precisely measured through a simplified and low-cost way with good thermal deformation calibration accuracy, and the absolute positioning coordinates of all axes of the machine tool can be calibrated in real time to avoid reduced positioning accuracy due to the thermal expansion of the multi-axis machine tool.

SUMMARY OF THE INVENTION

In view of the disadvantages in the conventional ways for solving the problems of thermal deformation of machine tools, it is a primary object of the present invention to provide a measurement, calibration and compensation system and method for machine tool, so that the thermal expansion amounts at all axes of a machine tool can be directly precisely measured through a simplified and low-cost way with good thermal deformation calibration accuracy, and the absolute positioning coordinates of all axes of the machine tool can be calibrated in real time to avoid reduced positioning accuracy due to the thermal expansion of the multi-axis machine tool.

To achieve the above and other objects, a first aspect of the present invention is to provide a measurement, calibration and compensation system for machine tool, which includes a first positioning base, two first speckle image sensors, a second positioning base, and two second speckle image sensors. The first positioning base has a first XY plane and a first XZ plane and is mounted on a machine bed of a machine tool to be located to a lateral side of an x-axis linear translation stage of the machine tool. The x-axis linear translation stage is mounted on the machine bed and the first positioning base can be made of a zero-expansion glass material, an Invar material or a granite material. The two first speckle image sensors are mounted on an object holding unit of the machine tool. The object holding unit is translatable on the x-axis linear translation stage along the x-axis. The first speckle image sensors separately sense along the x-axis a speckle position of the object holding unit at the first XY plane and a speckle position of the object holding unit at the first XZ plane before and after the machine tool is started for machining. A difference between the speckle positions of the object holding unit at the first XY plane before and after the machine tool is started for machining and a different between the speckle positions of the object holding unit at the first XZ plane before and after the machine tool is started for machining are used to calibrate and compensate a position of the object holding unit when the machine tool is machining. The second positioning base has a second XY plane and a second YZ plane and is mounted on the machine bed of the machine tool to be located to a lateral side of a y-axis linear translation stage and a z-axis linear translation stage of the machine tool. The y-axis linear translation stage is mounted on the machine bed, and the z-axis linear translation stage is translatable on the y-axis linear translation stage along the y-axis. The second positioning base can be made of a zero-expansion glass material, an Invar material, and a granite material. The two second speckle image sensors are separately mounted on a cutter holding unit and the z-axis linear translation stage of the machine tool. The cutter holding unit is translatable on the z-axis linear translation stage along the z-axis. One of the two second speckle image sensors senses along the y-axis a speckle position of the cutter holding unit at the second XY plane before and after the machine tool is started for machining, and the other second speckle image sensor senses along a YZ plane a speckle position of the cutter holding unit at the second YZ plane before and after the machine tool is started for machining. A difference between the speckle positions of the cutter holding unit at the second XY plane before and after the machine tool is started for machining and a difference between the speckle positions of the cutter holding unit at the second YZ plane before and after the machine tool is started for machining are used to calibrate and compensate a position of the cutter holding unit when the machine tool is machining.

The above-described measurement, calibration and compensation system for machine tool can further include a first adjustment bracket, a second adjustment bracket and a third adjustment bracket. The first speckle image sensors are mounted to the object holding unit of the machine tool via the first adjustment bracket; and the second speckle image sensors are mounted to the z-axis linear translation stage and the cutter holding unit of the machine tool via the second and the third adjustment bracket, respectively.

The above-described measurement, calibration and compensation system for machine tool can further include a first laser source, a first interference lens and a first reflector lens. The first interference lens is mounted on the first positioning base, the first reflector lens is mounted on the first adjustment bracket, and a laser beam emitted by the first laser source is projected onto the first reflector lens via the first interference lens. Whereby the first speckle image sensors can sense the speckle position of the object holding unit at the first XY plane and the speckle position of the object holding unit at the first XZ plane before the machine tool is started for machining.

The above-described measurement, calibration and compensation system for machine tool can further include a second laser source, a second interference lens and a second reflector lens. The second interference lens is mounted on the second positioning base, the second reflector lens is mounted on the second adjustment bracket that is mounted on the z-axis linear translation stage, and a laser beam emitted by the second laser source is projected onto the second reflector lens via the second interference lens. Whereby the second speckle image sensor can sense the speckle position of the tool holding unit at the second XY plane before the machine tool is started for machining.

The above-described measurement, calibration and compensation system for machine tool can further include a third laser source, a third interference lens, a third reflector lens, and a fourth reflector lens. The third interference lens is mounted on the machine bed of the machine tool, the third and the fourth reflector lens are respectively mounted on the z-axis linear translation stage and the third adjustment bracket that is mounted on the cutter holding unit, and a laser beam emitted by the third laser source is projected onto the fourth reflector lens on the third adjustment bracket via the third interference lens and the third reflector lens on the z-axis linear translation stage. Whereby the second speckle image sensor can sense the speckle position of the tool holding unit at the second YZ plane before the machine tool is started for machining.

To achieve the above and other objects, a second aspect of the present invention is to provide a measurement, calibration and compensation method for machine tool, which includes the following steps: (1) Before the machine tool is started for machining, use the measurement, calibration and compensation system for machine tool as claimed in claim 1 to sense along the x-axis a speckle position of the object holding unit of the machine tool at the first XY plane of the first positioning base and a speckle position of the object holding unit at the first XZ plane of the first positioning base, and also to sense along the y-axis a speckle position of the cutter holding unit of the machine tool at the second XY plane of the second positioning base as well as to sense along the YZ plane a speckle position of the cutter holding unit at the second YZ plane of the second positioning base; (2) After the machine tool has been started for machining, use the measurement, calibration and compensation system for machine tool as claimed in claim 1 to sense along the x-axis a speckle position of the object holding unit of the machine tool at the first XY plane of the first positioning base and a speckle position of the object holding unit at the first XZ plane of the first positioning base, and also to sense along the y-axis a speckle position of the cutter holding unit of the machine tool at the second XY plane of the second positioning base as well as to sense along YZ plane a speckle position of the cutter holding unit at the second YZ plane of the second positioning base; and (3) Use a difference between the speckle positions of the object holding unit at the first XY plane before and after the machine tool is started for machining and a different between the speckle positions of the object holding unit at the first XZ plane before and after the machine tool is started for machining to calibrate and compensate a position of the object holding unit when the machine tool is machining; and also use a difference between the speckle positions of the cutter holding unit at the second XY plane before and after the machine tool is started for machining and a difference between the speckle positions of the cutter holding unit at the second YZ plane before and after the machine tool is started for machining to calibrate and compensate a position of the cutter holding unit when the machine tool is machining.

The above-described measurement, calibration and compensation method for machine tool can further include a first adjustment bracket, a second adjustment bracket and a third adjustment bracket. The first speckle image sensors is mounted to the object holding unit of the machine tool via the first adjustment bracket; and the second speckle image sensors are mounted to the z-axis linear translation stage and the cutter holding unit of the machine tool via the second and the third adjustment bracket, respectively.

According to the above-described measurement, calibration and compensation method for machine tool, the measurement, calibration and compensation system for machine tool used in the step (1) can further include a first laser source, a first interference lens and a first reflector lens. The first interference lens is mounted on the first positioning base, the first reflector lens is mounted on the first adjustment bracket, and a laser beam emitted by the first laser source is projected onto the first reflector lens via the first interference lens. Whereby the first speckle image sensors can sense the speckle position of the object holding unit at the first XY plane and the speckle position of the object holding unit at the first XZ plane before the machine tool is started for machining.

According to the above-described measurement, calibration and compensation method for machine tool, the measurement, calibration and compensation system for machine tool used in the step (1) can further include a second laser source, a second interference lens and a second reflector lens. The second interference lens is mounted on the second positioning base, the second reflector lens is mounted on the second adjustment bracket that is mounted on the z-axis linear translation stage, and a laser beam emitted by the second laser source is projected onto the second reflector lens via the second interference lens. Whereby the second speckle image sensor can sense the speckle position of the tool holding unit at the second XY plane before the machine tool is started for machining.

According to the above-described measurement, calibration and compensation method for machine tool, the measurement, calibration and compensation system for machine tool used in the step (1) can further include a third laser source, a third interference lens, a third reflector lens and a fourth reflector lens. The third interference lens is mounted on the machine bed of the machine tool, the third and the fourth reflector lens are respectively mounted on the z-axis linear translation stage and the third adjustment bracket that is mounted on the cutter holding unit, and a laser beam emitted by the third laser source is projected onto the fourth reflector lens on third adjustment bracket via the third interference lens and the third reflector lens on the z-axis linear translation stage. Whereby the second speckle image sensor can sense the speckle position of the tool holding unit at the second YZ plane before the machine tool is started for machining.

With the measurement, calibration and compensation system and method for machine tool according to the present invention, the thermal expansion amounts at all s of the machine tool can be directly precisely measured through a simplified and low-cost way with good thermal deformation calibration accuracy, and the absolute positioning coordinates of all axes of the machine tool can be calibrated in real time to avoid reduced positioning accuracy due to the thermal expansion of the multi-axis machine tool.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
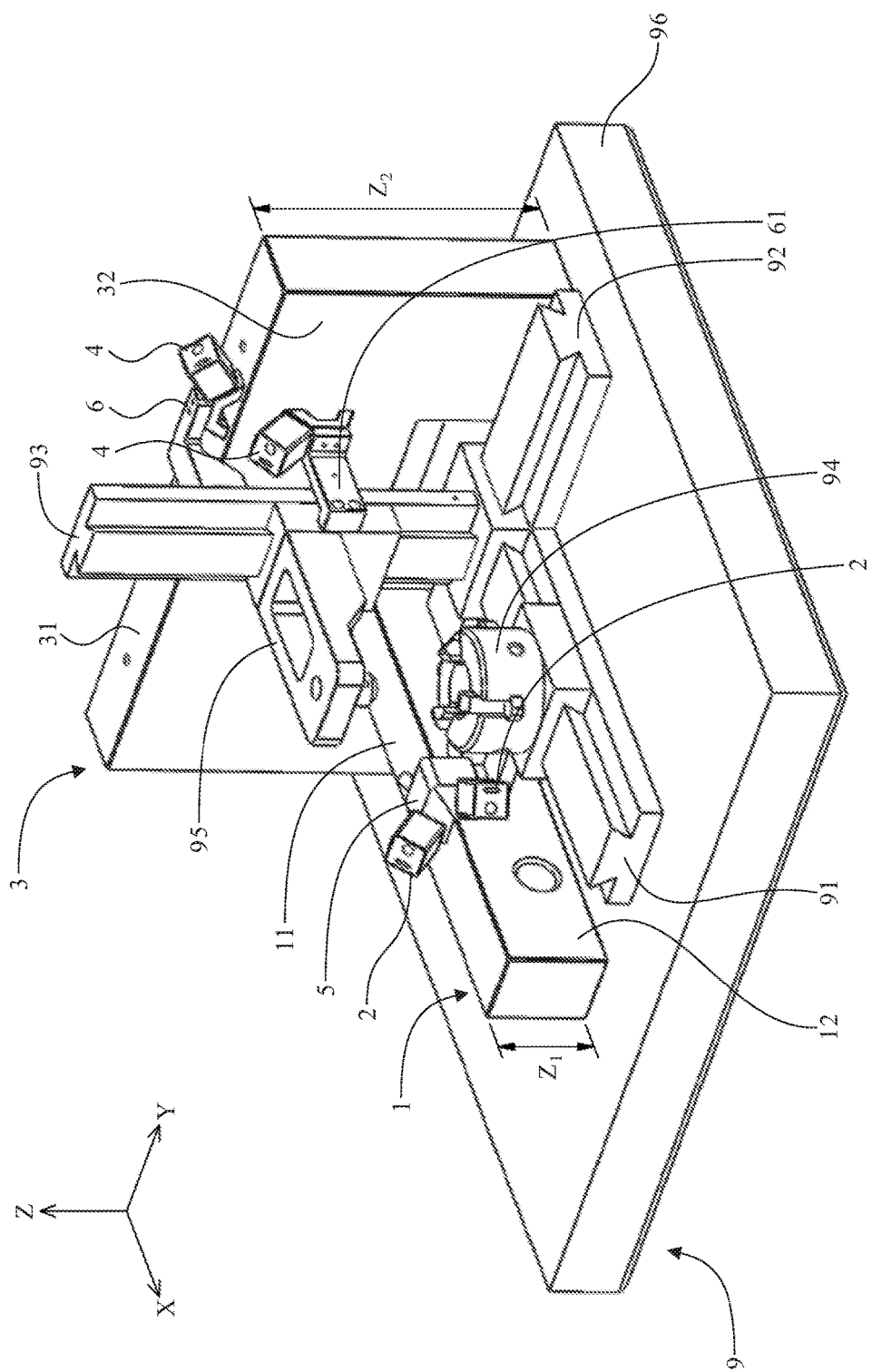
FIG. 1 is a schematic view showing a measurement, calibration and compensation system for machine tool according to a preferred embodiment of the present invention.

The present invention will now be described with a preferred embodiment thereof and by referring to the accompanying drawings.

Unlike the conventional thermal deformation compensation technique, which first measures the temperature variation of a machine tool and then calculates the thermal deformation amount of the machine tool, the present invention is characterized in mounting three-dimensional (3D) positioning bases on a multi-axis machine tool, taking advantage of the low-thermal-variation feature of the 3D positioning bases and incorporating the image invariant optical speckle capturing and positioning technique (referring to U.S. Pat. No. 7,715,016B2) to simultaneously provide detected thermal expansion induced 3D displacement amount of a cutter holding unit and of an object holding unit of the machine tool, so as to further obtain high-precision 3D relative thermal drift amount of the cutter holding unit and of the object holding unit for calibrating and compensating the positioning accuracy of the machine tool and according satisfy the positioning requirement for high-precision machining using a multi-axis machine tool.

In the image invariant optical speckle capturing and positioning technique, an optical speckle image sensor is used to recognize the moving of a constructive interference speckle into and out of an aperture of the optical speckle image sensor. Since the interference speckle has a relative optical path length difference smaller than one fifth of the wavelength thereof, a bright spot of the constructive interference speckle moving into the speckle image capturing range maintains constructive interference most of the time and still looks like a bright spot when the speckle moves out of the speckle image capturing range. When the captured speckle image is subjected to comparison and positioning using image processing software, such as SAD, SSD, NCC, SURF, SIFT and the like, a correct displacement amount from comparison can be obtained.

Taiwan Invention Patent No. 1532016 discloses the use of an image matching and positioning technique according to the Scale Invariant Feature Transform (SIFT) algorithm or an image matching and positioning technique according to the Speed Up Robust Feature (SURF) algorithm to acquire two sequential invariant speckle images for creating and matching speckle image features, and the use of the Statistical Dominance algorithm to remove matched features that are 1.5 times larger than the standard deviation of displacement. In this way, it is able to accurately compare two sequential speckle images and find the standard deviation of their displacement amounts on the image plane is smaller than 0.008 pixels, which is approximately equal to a standard deviation of $1/100$ pixel. In other words, when using the optical speckle image sensor acquire two speckle images on the surface of an object before and after thermal expansion thereof and then using a SIFT-based or a SURF-based image matching and positioning method on the two acquired speckle images, it is able to precisely obtain the relative thermal expansion induced displacement amount before and after the thermal expansion of the object's surface.

Figure 2:
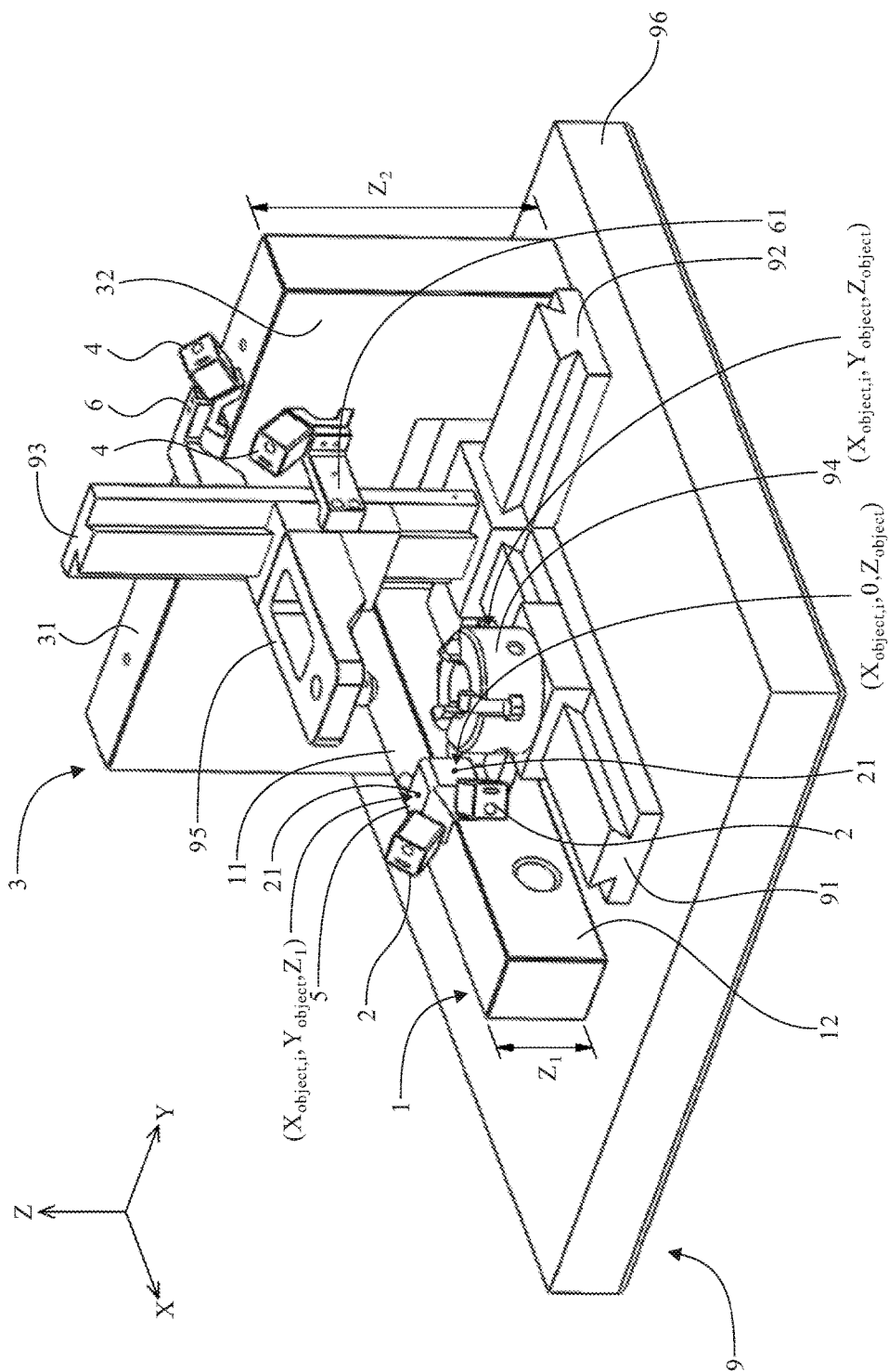
FIG. 2 is a schematic view showing the speckle image positioning points for an object holding unit are obtained using the measurement, calibration and compensation system for machine tool according to the preferred embodiment of the present invention.
Figure 3:
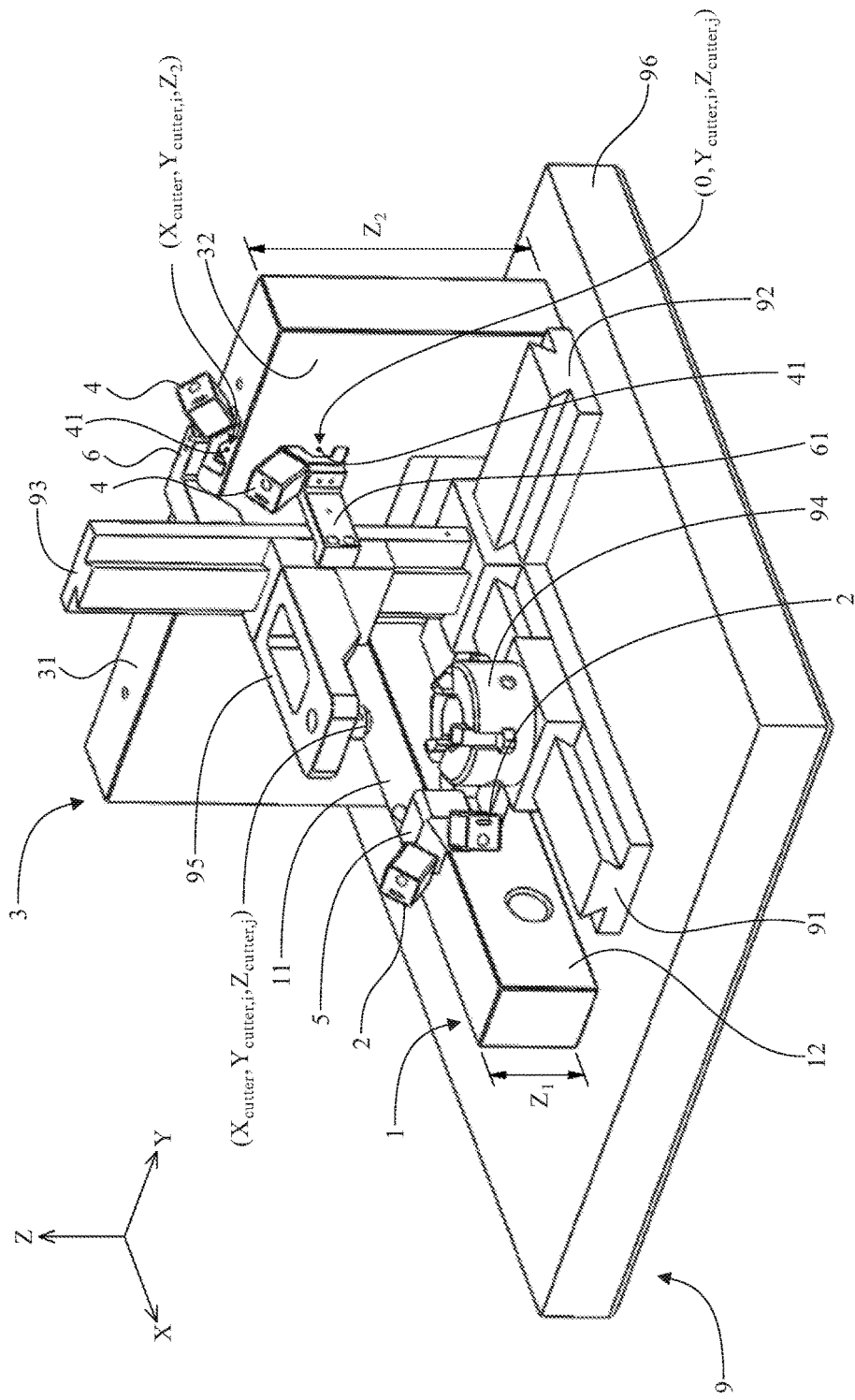
FIG. 3 is a schematic view showing the speckle image positioning points for a cutter holding unit are obtained using the measurement, calibration and compensation system for machine tool according to the preferred embodiment of the present invention.

Please refer to FIGS. 1 to 3. Based on the above described principles, a first aspect of the present invention is to provide a measurement, calibration and compensation system for machine tool, which includes a first positioning base 1, two first speckle image sensors 2, a second positioning base 3, and two second speckle image sensors 4. The first positioning base 1 can be in the form of a rectangular prism and has a first XY plane 11 and a first XZ plane 12. The first positioning base 1 is mounted on a machine bed 96 of a machine tool 9 and is located to a lateral side of an x-axis linear translation stage 91 of the machine tool 9. The first XY plane 11 is facing upward and the first XZ plane 12 is facing toward the x-axis linear translation stage 91, which is mounted on the machine bed 96. The first positioning base 1 can be made of a zero-expansion glass material, an Invar material, or a granite material. The first speckle image sensors 2 can be an invariant speckle pickup head and are mounted on an object holding unit 94 of the machine tool 9. The object holding unit 94 can fixedly hold an object (workpiece) to be machined and can linearly translate on the x-axis linear translation stage 91 along the x-axis. In addition, the object holding unit 94 can rotate about the C-axis. Before and after the machine tool 9 starts machining, the first speckle image sensors 2 move along with the object holding unit 94 in the x-axis direction to separately sense speckle positions of the object holding unit 94 on the first XY plane 11 and on the first XZ plane 12. The difference between the speckle positions of the object holding unit 94 on the first XY plane 11 before and after the machine tool 9 starts machining, as well as the difference between the speckle positions of the object holding unit 94 on the first XZ plane 12 before and after the machine tool 9 starts machining are used to calibrate and compensate the position of the object holding unit 94 when the machine tool 9 is machining. The second positioning base 3 can be in the form of a wide and flat rectangular prism and has a second XY plane 31 and a second YZ plane 32. The first XY plane 11 and the first XZ plane 12 of the first positioning base 1 are perpendicular to the second YZ plane 32 of the second positioning base 3. The second positioning base 3 is mounted on the machine bed 96 of the machine tool 9 and is located to a lateral side of a y-axis linear translation stage 92 and a z-axis linear translation stage 93 of the machine tool 9. The second XY plane 31 is facing upward and the second YZ plane 32 is facing toward the y-axis linear translation stage 92 and the z-axis linear translation stage 93. The y-axis linear translation stage 92 is mounted on the machine bed 96, and the z-axis linear translation stage 93 can linearly translate on the y-axis linear translation stage 92 along the y-axis. The second positioning base 3 can be made of a zero-expansion glass material, an Invar material, or a granite material. The second speckle image sensors 4 can be an invariant speckle pickup head and are separately mounted on a cutter holding unit 95 and the z-axis linear translation stage 93 of the machine tool 9. The cutter holding unit 95 can fixedly hold a cutter for machining the object and can linearly translate on the z-axis linear translation stage 93 along the z-axis. In addition, the cutter holding unit 95 can rotate about the A-axis. Before and after the machine tool 9 starts machining, one of the second speckle image sensors 4 moves along with the z-axis linear translation stage 93 in the y-axis direction to sense the speckle positions of the cutter holding unit 95 on the second XY plane 31, and the other one of the second speckle image sensors 4 moves along with the z-axis linear translation stage 93 and the cutter holding unit 95 along the YZ plane to sense speckle positions of the cutter holding unit 95 on the second YZ plane 32. The difference between the speckle positions of the cutter holding unit 95 on the second XY plane 31 before and after the machine tool 9 starts machining, as well as the difference between the speckle positions of the cutter holding unit 95 on the second YZ plane 32 before and after the machine tool 9 starts machining are used to calibrate and compensate the position of the cutter holding unit 95 when the machine tool 9 is machining. Further, it is understood the mounting of the first positioning base 1 on a lateral side of the x-axis linear translation stage 91 of the machine tool 9 and the mounting of the second positioning base 3 on a lateral side of the y-axis linear translation stage 92 and the z-axis linear translation stage 93 are only illustrative; and in other operable embodiments of the present invention, the first positioning base 1 can be otherwise mounted on a lateral side of the y-axis linear translation stage 92 of the machine tool 9 and the second positioning base 3 can be otherwise mounted on a lateral side of the x-axis linear translation stage 91 and the z-axis linear translation stage 93 of the machine tool 9, or the first positioning base 1 can be otherwise mounted on a lateral side of the z-axis linear translation stage 93 of the machine tool 9 and the second positioning base 3 can be otherwise mounted on a lateral side of the x-axis linear translation stage 91 and the y-axis linear translation stage 92 of the machine tool 9, which all fall within the protection scope of the present invention.

Referring to FIGS. 1 to 3. The measurement, calibration and compensation system for the machine tool 9 according to the present invention can further include a first adjustment bracket 5, a second adjustment bracket 6, and a third adjustment bracket 61. The first speckle image sensors 2 are mounted on the object holding unit 94 of the machine tool 9 via the first adjustment bracket 5; and the second speckle image sensors 4 are mounted on the z-axis linear translation stage 93 and the cutter holding unit 95 of the machine tool 9 via the second adjustment bracket 6 and the third adjustment bracket 61, respectively. With these arrangements, the first speckle image sensors 2 can be further adjusted in position and orientation via the first adjustment bracket 5, and the second speckle image sensors 4 can be further separately adjusted in position and orientation via the second adjustment bracket 6 and the third adjustment bracket 61.

A second aspect of the present invention is to provide a measurement, calibration and compensation method for machine tool. Please refer to FIGS. 1 to 3. The method of the present invention includes the following steps: (1) Before the machine tool 9 is started for machining, use the above-described measurement, calibration and compensation system for machine tool to sense along the x-axis a speckle position of the object holding unit 94 of the machine tool 9 at the first XY plane 11 of the first positioning base 1 and a speckle position of the object holding unit 94 at the first XZ plane 12 of the first positioning base 1, and also to sense along the y-axis a speckle position of the cutter holding unit 95 of the machine tool 9 at the second XY plane 31 of the second positioning base 3 as well as to sense along the YZ plane a speckle position of the cutter holding unit 95 at the second YZ plane 32 of the second positioning base 3; (2) After the machine tool 9 has been started fir machining, use the above-described measurement, calibration and compensation system for machine tool to sense along the x-axis a speckle position of the object holding unit 94 of the machine tool 9 at the first XY plane 11 of the first positioning base 1 and a speckle position of the object holding unit 94 at the first XZ plane 12 of the first positioning base 1, and also to sense along the y-axis a speckle position of the cutter holding unit 95 of the machine tool 9 at the second XY plane 31 of the second positioning base 3 as well as to sense along the YZ plane a speckle position of the cutter holding unit 95 at the second YZ plane 32 of the second positioning base 3; and (3) Use a difference between the speckle positions of the object holding unit 94 at the first XY plane 11 before and after the machine tool 9 is started for machining and a different between the speckle positions of the object holding unit 94 at the first XZ plane 12 before and after the machine tool is started for machining to calibrate and compensate a position of the object holding unit 94 when the machine tool 9 is machining; and also using a difference between the speckle positions of the cutter holding unit 95 at the second XY plane 31 before and after the machine tool 9 is started for machining and a difference between the speckle positions of the cutter holding unit 95 at the second YZ plane 32 before and after the machine tool 9 is started for machining to calibrate and compensate a position of the cutter holding unit 95 when the machine tool is machining.

Referring to FIGS. 1 to 3. In the measurement, calibration and compensation method for machine tool according to the present invention, a first adjustment bracket 5, a second adjustment bracket 6 and a third adjustment bracket 61 are further provided. The first speckle image sensors 2 are mounted on the object holding unit 94 of the machine tool 9 via the first adjustment bracket 5; and the second speckle image sensors 4 are mounted on the z-axis linear translation stage 93 and the cutter holding unit 95 of the machine tool 9 via the second adjustment bracket 6 and the third adjustment bracket 61, respectively. With these arrangements, the first speckle image sensors 2 can be further adjusted in position and orientation via the first adjustment bracket 5, and the second speckle image sensors 4 can be further separately adjusted in position and orientation via the second adjustment bracket 6 and the third adjustment bracket 61.

Please refer to FIG. 2. Two speckle images positioning points 21 of the object holding unit 94 are positioned via the first speckle image sensors 2. One of the two positioning points 21 is located at Y=0 and the first XZ plane 12 and has speckle image positioning coordinates ($X_{object,\ i}$, 0, $Z_{object}$) while the other one of the two positioning points 21 is located at $Z=Z_1$ and the first XY plane 11 and has speckle image positioning coordinates ($X_{object,\ i}$, $Y_{object}$, $Z_1$). By combining the two positioning points 21, it is able to obtain the speckle image positioning coordinates ($X_{object,\ i}$, $Y_{object}$, $Z_{object}$) of the object holding unit 94 positioned on the first positioning base 1. Please refer to FIG. 3. The cutter holding unit 95 can be moved on the second YZ plane 32, and two speckle images positioning points 41 of the cutter holding unit 95 are positioned via the second speckle image sensors 4. One of the two positioning points 41 is located at $Z=Z_2$ and the second XY plane 31 and has speckle image positioning coordinates ($X_{cutter}$, $Y_{cutter,\ i}$, $Z_2$), while the other one of the two positioning points 41 is located at X=0 and the second YZ plane 32 and has speckle image positioning coordinates (0, $Y_{cutter,\ i}$, $Z_{cutter,\ j}$). By combining the two positioning points 41, it is able to obtain the speckle image positioning coordinates ($X_{cutter}$, $Y_{cutter,\ i}$, $Z_{cutter,\ j}$) of the cutter holding unit 95 positioned on the second positioning base 3. From the speckle image positioning coordinates ($X_{object,\ i}$, $Y_{object}$, $Z_{object}$) of the object holding unit 94 positioned on the first positioning base 1 and the speckle image positioning coordinates ($X_{cutter}$, $Y_{cutter,\ i}$, $Z_{cutter,\ j}$) of the cutter holding unit 95 positioned on the second positioning base 3 plus the mounting size and orientation of the first adjustment bracket 5, the second adjustment bracket 6 and the third adjustment bracket 61, it is able to obtain the absolute positioning coordinates of a geometric center of the object holding unit 94 relative to the first positioning base 1 as well as the absolute positioning coordinates of a geometric center of the cutter holding unit 95 relative to the second positioning base 3. Further, initial positioning markings can be produced for the x-axis, the y-axis and the z-axis. For example, one x-axis initial positioning marking $X=X_0$ can be produced at $Z=Z_1$ and the first XY plane 11 and another x-axis initial positioning marking $X=X_0$ can be produced at Y=0 and the first XZ plane 12. These two x-axis initial positioning markings have the same x-axis reading. Similarly, a y-axis initial positioning marking $Y=Y_0$ can be produced at $Z=Z_2$ and the second XY plane 31, and a z-axis initial positioning marking $Z=Z_0$ can be produced at X=0 and the second YZ plane 32. Moreover, since the first positioning base 1 and the second positioning base 3 can be made of a zero-expansion glass material, an Invar material or a granite material, they can have a total deformation amount smaller than the specification value. In addition, since the heat produced by the machine tool 9 would not be easily transferred to the first positioning base 1 and the second positioning base 3, and since the temperature of the first and the second positioning base 1, 3 can be easily precisely controlled, the first and the second positioning base 1, 3 can provide an excellent, highly-stable three-dimensional calibration and compensation system.

Figure 4:
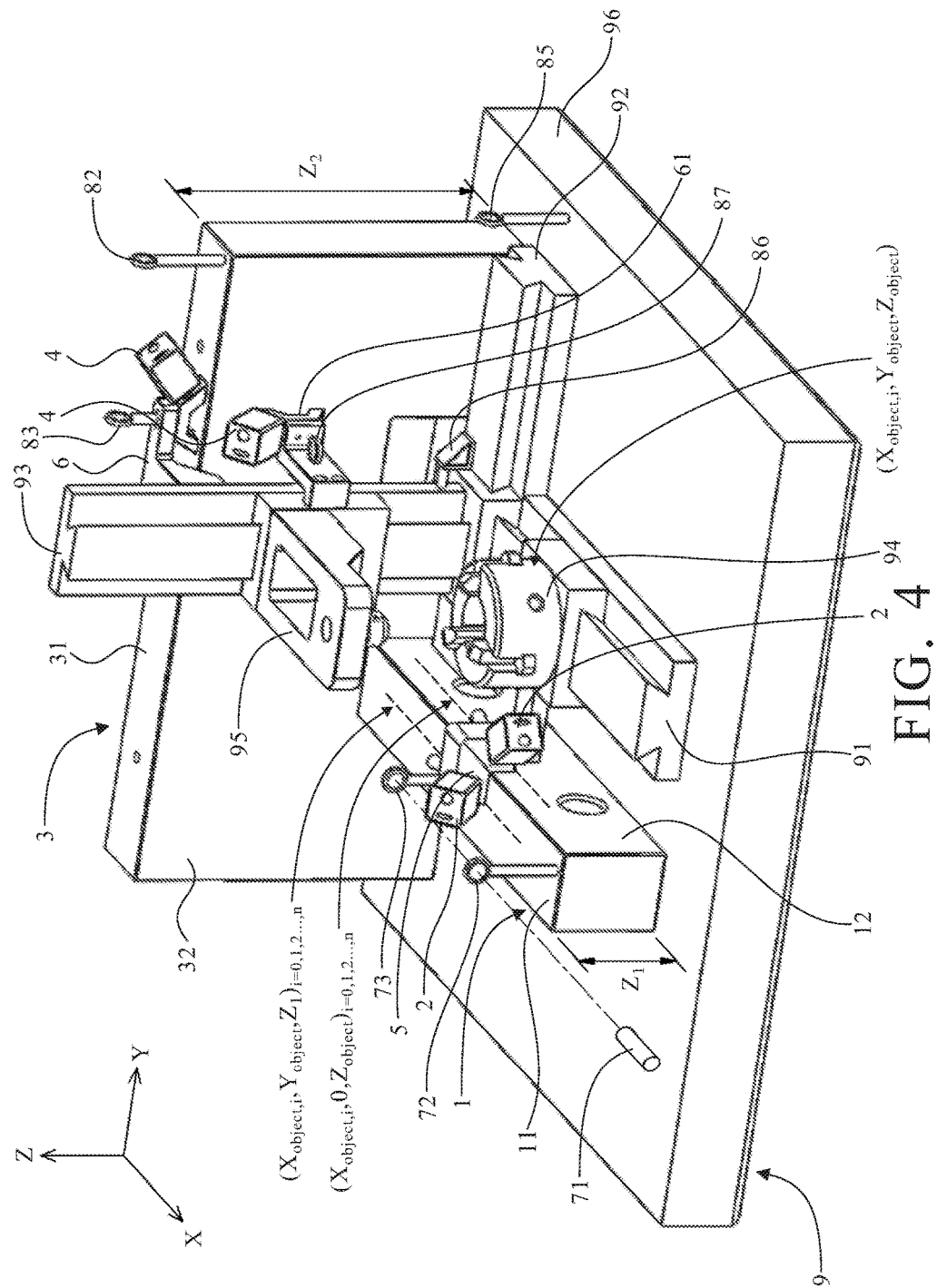
FIG. 4 is a schematic view showing the speckle positions of the object holding unit along the x-axis before the machine tool starts machining, obtained using the measurement, calibration and compensation system and method fir machine tool according to the preferred embodiment of the present invention.

Please refer to FIG. 4. The measurement, calibration and compensation system for machine tool according to the present invention can further include a laser interferometer composed of a first laser source 71, a first interference lens 72 and a first reflector lens 73. The first interference lens 72 is mounted on the first XY plane 11 of the first positioning base 1, and the first reflector lens 73 is mounted on the first adjustment bracket 5. A laser beam emitted by the first laser source 71 is projected onto the first reflector lens 73 via the first interference lens 72, such that the first speckle image sensors 2 can, before the machine tool 9 starts machining, sense the speckle position of the object holding unit 94 on the first XY plane 11 and the speckle position of the object holding unit 94 on the first XZ plane 12. In other words, the first reflector lens 73 reflects the laser beam to the laser interferometer to measure a relative displacement distance between the first reflector lens 73 and the first interference lens 72; and this displacement distance is used to assist the first speckle image sensors 2 in establishing speckle position coordinates and speckle position databases for the speckle images at the first XY plane 11 and the first XZ plane 12 before the machine tool 9 is started for machining.

Referring to FIG. 4. In the step (1) of the measurement, calibration and compensation method for machine tool according to the present invention, the measurement, calibration and compensation system for the machine tool 9 can further include a laser interferometer composed of a first laser source 71, a first interference lens 72 and a first reflector lens 73. The first interference lens 72 is mounted on the first XY plane 11 of the first positioning base 1, and the first reflector lens 73 is mounted on the first adjustment bracket 5. A laser beam emitted by the first laser source 71 is projected onto the first reflector lens 73 via the first interference lens 72, such that the first speckle image sensors 2 can, before the machine tool 9 starts machining, sense the speckle position of the object holding unit 94 on the first XY plane 11 and the speckle position of the object holding unit 94 on the first XZ plane 12. In other words, the first reflector lens 73 reflects the laser beam to the laser interferometer to measure a relative displacement distance between the first reflector lens 73 and the first interference lens 72; and this displacement distance is used to assist the first speckle image sensors 2 in establishing speckle position coordinates and speckle position databases for the speckle images at the first XY plane 11 and the first XZ plane 12 before the machine tool 9 is started for machining.

The following is a detailed description of the use of the first laser source 71, the first interference lens 72 and the first reflector lens 73. Please refer to FIG. 4. First, within the entire displacement range along the x-axis, carefully calibrate the laser spot that returns to the first interference lens 72 from the first reflector lens 73, so that the laser spot does not drift due to the movement of the first reflector lens 73. Then, a displacement starting point on the x-axis linear translation stage 91 is set to the x-axis initial markings $Z=Z_1$ and $X=X_0$. Thereafter, use an x-axis linear encoder to move the first reflector lens 73 repeatedly by a fixed distance about 20~100 μm for n times. After each time of displacement positioning, the first speckle image sensors 2 acquire the speckle image on the first XY plane of the first positioning base 1 and the speckle image on the first XZ plane 12 of the first positioning base 1. Total (n+1) speckle images are recorded, and then use the first laser source 71, the first interference lens 72 and the first reflector lens 73 to measure the coordinate displacement amounts of the speckle images along the x-axis. Then, a database of speckle positions on the first XY plane 11 and a database of speckle positions on the first XZ plane 12 are established. (1) The database of speckle positions on the first XZ plane 12 has an y-axis value of $Y=0$ and is indicated by $(X_{object,i}, 0, Z_{object})_{i=0,1,2,\ldots,n}$, wherein the x-axis starting point $X_{object,0}$ has a coordinate value of $X_0$, while all other positions $X_{object,i}$ respectively have a coordinate value measured by the first laser source 71, the first interference lens 72 and the first reflector lens 73. Therefore, in the speckle position database $(X_{object,i}, 0, Z_{object})_{i=0,1,2,\ldots,n}$, there are included (n+1) coordinate speckle images and their corresponding absolute positioning coordinates. (2) The database of speckle positions on the first XY plane 11 has a z-axis value of $Z=Z_1$ and is indicated by $(X_{object,i}, Y_{object}, Z_1)_{i=0,1,2,\ldots,n}$, wherein the x-axis starting point $X_{object,0}$ has a coordinate value of $X_0$, while all other positions $X_{object,i}$ respectively have a coordinate value measured by the first laser source 71, the first interference lens 72 and the first reflector lens 73. Therefore, in the speckle position database $(X_{object,i}, Y_{object}, Z_1)_{i=0,1,2,\ldots,n}$, there are included (n+1) coordinate speckle images and their corresponding absolute positioning coordinates. Then, the above two speckle position databases can be combined to obtain speckle position coordinates $(X_{object,i}, Y_{object}, Z_{object})_{i=0,1,2,\ldots,n}$ of the object holding unit 94 on the first positioning base 1. Wherein, a displacement vector $(\Delta X, \Delta Z)_{Y=0, 1st\ XZ\ plane}$ generated after a real-time position speckle image at $Y=0$ and the first XZ plane 12 is compared with the coordinate speckle images in the speckle position database $(X_{object,i}, 0, Z_{object})_{i=0,1,2,\ldots,n}$ can provide a displacement amount $\Delta X$ of $X_{object,i}$ and a displacement amount $\Delta Z$ of $Z_{object}$. Similarly, a displacement vector $(\Delta X, \Delta Y)_{Z=Z1, 1st\ XY\ plane}$ generated after a real-time position speckle image at $Z=Z_1$ and the first XY plane 11 is compared with the coordinate speckle images in the speckle position database $(X_{object,i}, Y_{object}, Z_1)_{i=0,1,2,\ldots,n}$ can provide a displacement amount $\Delta X$ of $X_{object,i}$ and a displacement amount $\Delta Y$ of $Y_{object}$. The x-axis displacement amounts of the real-time speckle positions on the first XY plane 11 and the first XZ plane 12 should be the same or a difference between them should be smaller than the specified system positioning calculation accuracy. To obtain a more accurate displacement amount $\Delta X$, a mean of two displacement amounts can be used as the $\Delta X$. That is, $\Delta X = (\Delta X_{Y=0, 1st\ XY\ plane} + \Delta X_{Z=Z1, 1st\ XY\ plane})/2$.

Figure 5:
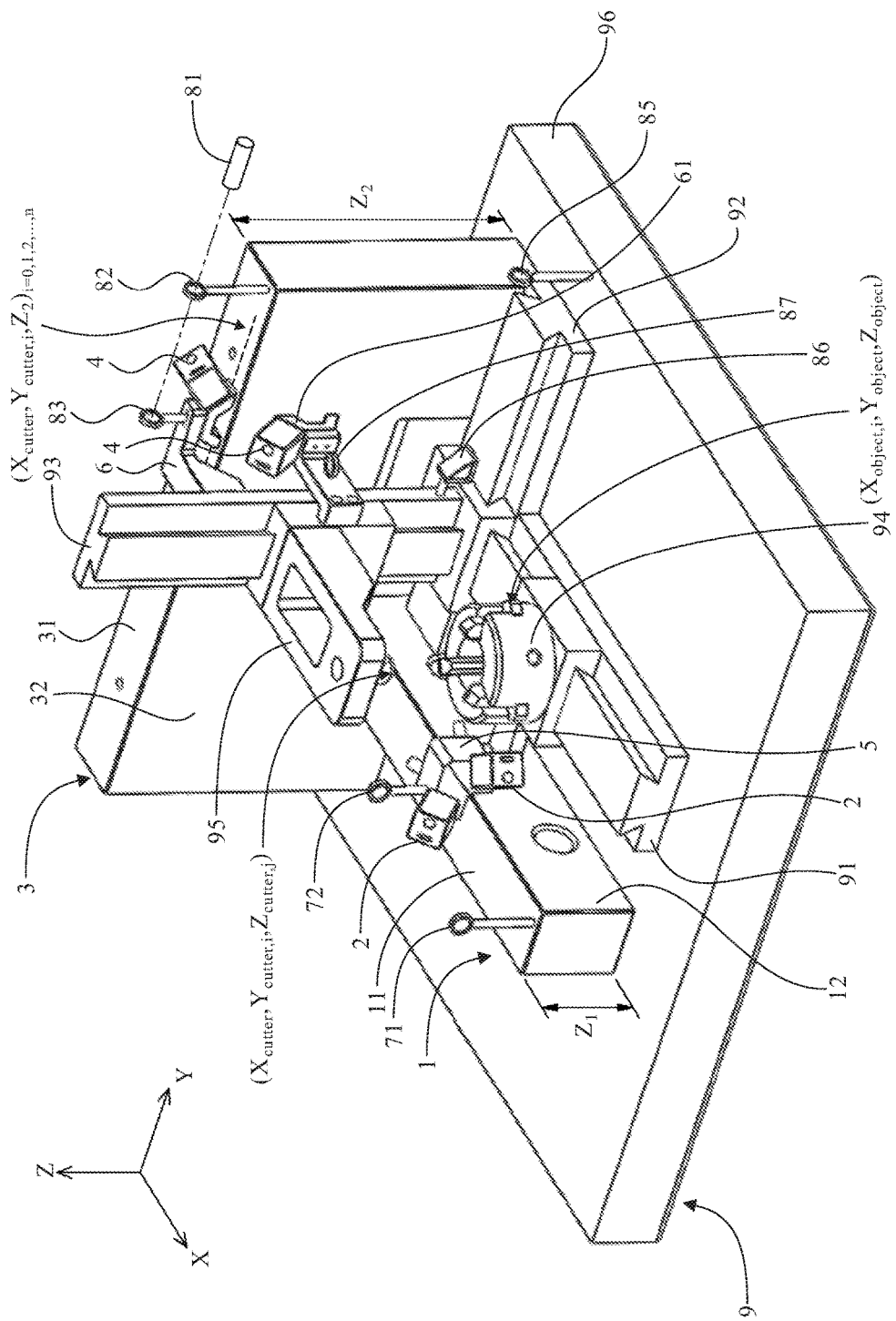
FIG. 5 is a schematic view showing the speckle positions of the cutter holding unit along the y-axis before the machine tool starts machining, obtained using the measurement, calibration and compensation system and method for machine tool according to the preferred embodiment of the present invention.

Please refer to FIG. 5. The measurement, calibration and compensation system for machine tool according to the present invention can further include a laser interferometer composed of a second laser source 81, a second interference lens 82 and a second reflector lens 83. The second interference lens 82 is mounted on the second XY plane 31 of the second positioning base 3, and the second reflector lens 83 is mounted on the second adjustment bracket 6 that is connected to the z-axis linear translation stage 93. A laser beam emitted by the second laser source 81 is projected onto the second reflector lens 83 via the second interference lens 82, such that the second speckle image sensors 4 can, before the machine tool 9 starts machining, sense the speckle position of the cutter holding unit 95 on the second XY plane 31. In other words, the second reflector lens 83 reflects the laser beam to the laser interferometer to measure a relative displacement distance between the second reflector lens 83 and the second interference lens 82; and this displacement distance is used to assist the second speckle image sensor 4 in establishing speckle position coordinates and a speckle position database for the speckle images at the second XY plane 31 before the machine tool 9 is started for machining.

Referring to FIG. 5. In the step (1) of the measurement, calibration and compensation method for machine tool according to the present invention, the measurement, calibration and compensation system for the machine tool 9 can further include a laser interferometer composed of a second laser source 81, a second interference lens 82 and a second reflector lens 83. The second interference lens 82 is mounted on the second XY plane 31 of the second positioning base 3, and the second reflector lens 83 is mounted on the second adjustment bracket 6 that is connected to the z-axis linear translation stage 93. A laser beam emitted by the second laser source 81 is projected onto the second reflector lens 83 via the second interference lens 82, such at the second speckle image sensors 4 can, before the machine tool 9 starts machining, sense the speckle position of the cutter holding unit 95 on the second XY plane 31. In other words, the second reflector lens 83 reflects the laser beam to the laser interferometer to measure a relative displacement distance between the second reflector lens 83 and the second interference lens 82; and this displacement distance is used to assist the second speckle image sensor 4 in establishing speckle position coordinates and a speckle position database for the speckle images at the second XY plane 31 before the machine tool 9 is started for machining.

Figure 6:
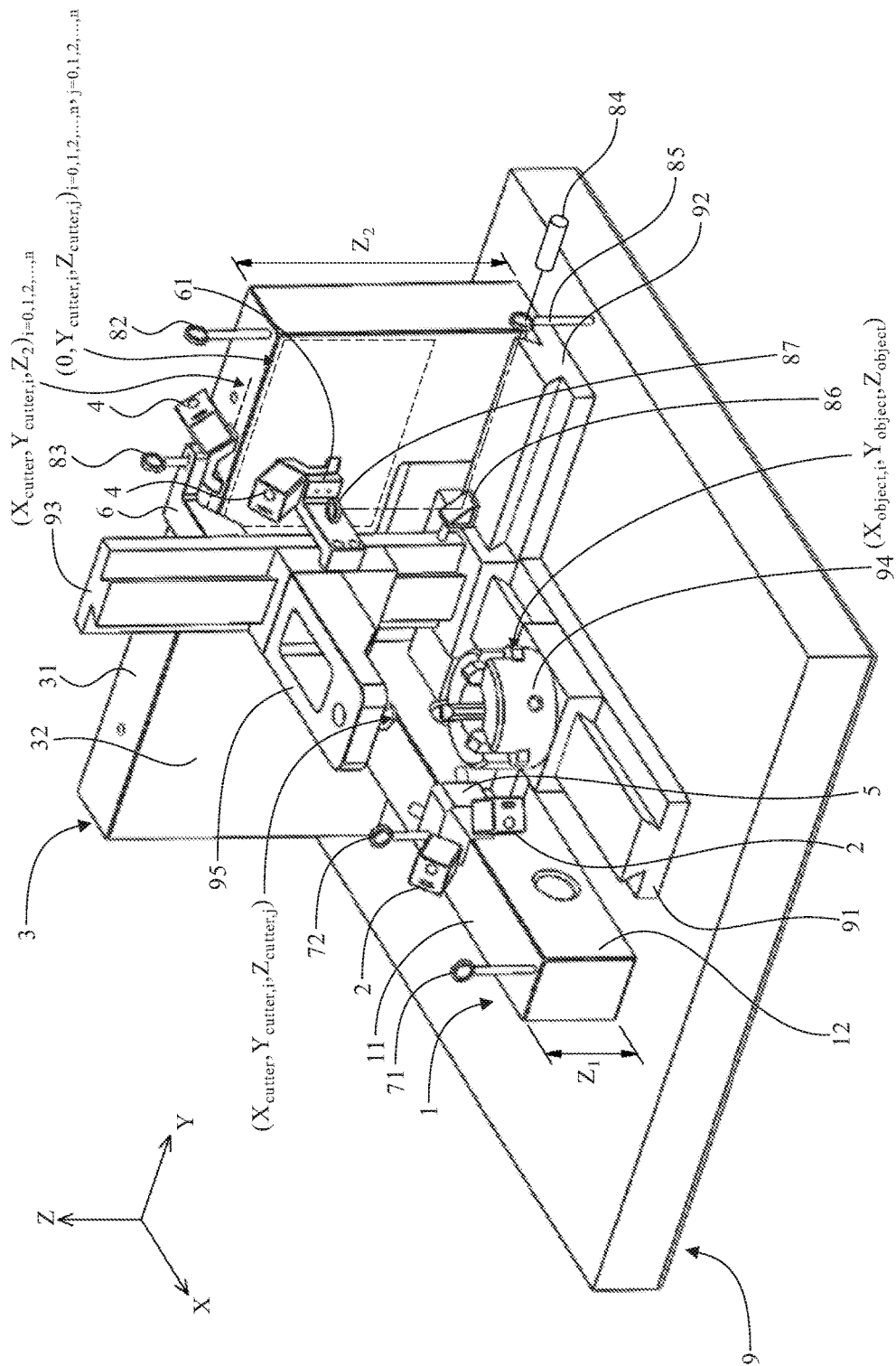
FIG. 6 is a schematic view showing the speckle positions of the cutter holding unit along the YZ plane before the machine tool starts machining, obtained using the measurement, calibration and compensation system and method for machine tool according to the preferred embodiment of the present invention.

Please refer to FIG. 6. The measurement, calibration and compensation system for machine tool according to the present invention can further include a laser interferometer composed of a third laser source 84, a third interference lens 85, a third reflector lens 86, and a fourth reflector lens 87. The third interference lens 85 is mounted on the machine bed 96 of the machine tool 9, the third reflector lens 86 is a 45-degree reflector lens mounted to a lateral side of the z-axis linear translation stage 93, and the fourth reflector lens 87 is a flat reflector lens mounted on the third adjustment bracket 61 that is connected to the cutter holding unit 95. A laser beam emitted by the third laser source 84 is projected onto the fourth reflector lens 87, which is connected to the third adjustment bracket 61, via the third interference lens 85 and the third reflector lens 86 connected to the z-axis linear translation stage 93, such that the second speckle image sensor 4 can, before the machine tool 9 starts machining, sense the speckle position of the cutter holding unit 95 on the second YZ plane 32. In other words, the fourth reflector lens 87 connected to the third adjustment bracket 61 reflects the laser beam to the laser interferometer to measure a relative displacement distance between the fourth reflector lens 87 on the third adjustment bracket 61 and the third interference lens 85; and this displacement distance is used to assist the second speckle image sensor 4 in establishing speckle position coordinates and a speckle position database for the speckle images at the second YZ plane 32 before the machine tool 9 is started for machining.

Referring to FIG. 6. In the step (1) of the measurement, calibration and compensation method for machine tool according to the present invention, the measurement, calibration and compensation system for the machine tool 9 can further include a laser interferometer composed of a third laser source 84, a third interference lens 85, a third reflector lens 86, and a fourth reflector lens 87. The third interference lens 85 is mounted on the machine bed 96 of the machine tool 9, the third reflector lens 86 is a 45-degree reflector lens mounted to a lateral side of the z-axis linear translation stage 93, and the fourth reflector lens 87 is a flat reflector lens mounted on the third adjustment bracket 61 that is connected to the cutter holding unit 95. A laser beam emitted by the third laser source 84 is projected onto the fourth reflector lens 87, which is connected to the third adjustment bracket 61, via the third interference lens 85 and the third reflector lens 86 connected to the z-axis linear translation stage 93, such that the second speckle image sensor 4 can, before the machine tool 9 starts machining, sense the speckle position of the cutter holding unit 95 on the second YZ plane 32. In other words, the fourth reflector lens 87 connected to the third adjustment bracket 61 reflects the laser beam to the laser interferometer to measure a relative displacement distance between the fourth reflector lens 87 on the third adjustment bracket 61 and the third interference lens 85; and this displacement distance is used to assist the second speckle image sensor 4 in establishing speckle position coordinates and a speckle position database for the speckle images at the second YZ plane 32 before the machine tool 9 is started for machining.

The following is a detailed description of the use of the second laser sources 81, 84, the second interference lenses 82, 85 and the second reflector lenses 83, 86, 87. Please refer to FIG. 5. First, within the entire displacement range along the y-axis, carefully calibrate the laser spot that returns to the second interference lens 82 from the second reflector lens 83, so that the laser spot does not drift due to the movement of the second reflector lens 83. Then, set a displacement g point on the y-axis linear translation stage 92 to the y-axis initial markings $Z=Z_2$ and $Y=Y_0$. Thereafter, use a y-axis linear encoder to move the second reflector lens 83 repeatedly by a fixed distance about 20~100 μm for n times. After each time of displacement positioning, the second speckle image sensor 4 acquires the speckle image on the second XY plane 31 of the second positioning base 3. Total (n+1) speckle images are recorded, and then use the second laser source 81, the second interference lens 82 and the second reflector lens 83 to measure the coordinate displacement amounts of the speckle images along the y-axis. Then, a speckle position database $(X_{cutter}, Y_{cutter,i}, Z_2)_{i=0,1,2 \ldots, n}$ of speckle images at $Z=Z_2$ and the second XY plane 31 is established. Wherein, $Y_{cutter,0}$ has a coordinate value of $Y_0$, while all other $Y_{cutter,i}$ with i=1~n respectively have a relative displacement value measured by the second laser source 81, the second interference lens 82 and the second reflector lens 83. Therefore, in the speckle position database $(X_{cutter}, Y_{cutter,i}, Z_2)_{i=0,1,2 \ldots, n}$, there are included (n+1) coordinate speckle images and their corresponding absolute positioning coordinates. Please refer to FIG. 6. First, within the entire displacement range along the z-axis, carefully calibrate the laser spot that returns to the third interference lens 85 from the third reflector lens 86 and the fourth reflector lens 87, so that the laser spot does not drift due to the movement of the third reflector lens 86 and the fourth reflector lens 87. Since a speckle position database of speckle images at X=0 and the second YZ plane 32 is to be established, it is necessary to use the speckle position database $(X_{cutter}, Y_{cutter,i}, Z_2)_{i=0,1,2 \ldots, n}$ of speckle images at $Z=Z_2$ and the second XY plane 31. First, it is necessary to determine the speckle positions of the z-axis linear translation stage 93 in the y-axis direction. Then, the speckle positions in the z-axis direction are marked. More specifically, first return the z-axis linear translation stage 93 to the y-axis work starting point. To do so, first use the speckle position database $(X_{cutter}, Y_{cutter,i}, Z_2)_{i=0,1,2 \ldots, n}$ to acquire the speckle image of the starting point $(X_{cutter}, Y_0, Z_2)$ of the y-axis linear translation stage 92. Then, move the z-axis linear translation stage 93, and the real-time speckle image acquired by the second speckle image sensor 4 connected to the z-axis linear translation stage 93 is compared with the speckle image of $(X_{cutter}, Y_0, Z_2)$ using the image matching and positioning technique according to SIFT to move the z-axis linear translation stage 93 to the position of $Y_{cutter,0}=Y_0$ (the positioning error is smaller than the specified system positioning accuracy), so as to complete the operation of returning the z-axis linear translation stage 93 to the y-axis work starting point. Thereafter, move the speckle image positioning point 41 of the second speckle image sensor 4 mounted on the cutter holding unit 95 to the positioning marking of the z-axis work starting point at X=0, $Y_{cutter,0}=Y_0$, $Z_{cutter,0}=Z_0$. Use a z-axis linear encoder to move the second reflector lens 87 repeatedly by a fixed distance about 20-100 μm for n times. After each time of displacement positioning, the second speckle image sensor 4 acquires the speckle image on the second YZ plane 32 of the second positioning base 3. Total (n+1) speckle images are recorded, and then use the third laser source 84, the third interference lens 85, the third reflector lens 86, and the fourth reflector lens 87 to measure the coordinate displacement amounts of the speckle images along the z-axis. Then, a No. zero speckle position database (0, $Y_{cutter,0}$, $Z_{cutter,j})_{j=0,1,2\ldots,n}$ is established for the speckle images in the z-axis direction at the position of X=0 and $Y=Y_{cutter,0}=Y_0$ on the second YZ plane 32. Wherein, the coordinate value of $Y_{cutter,0}$ is $Y_0$, the coordinate value of $Z_{cutter,0}$ is $Z_0$, while all other $Z_{cutter,j}$ with j=1, 2, 3 ..., n respectively have a relative displacement value measured by the third laser source 84, the third interference lens 85, the third reflector lens 86, and the fourth reflector lens 87. Therefore, in the speckle position database (0, $Y_{cutter,0}$, $Z_{cutter,j})_{j\ 0,1,2\ldots,n}$, there are included (n+1) coordinate speckle images and their corresponding absolute positioning coordinates. Then, use the speckle position database ($X_{cutter}$, $Y_{cutter,i}$, $Z_2)_{i=0,1,2\ldots,n}$ to acquire the speckle image at the first positioning point ($X_{cutter}$, $Y_{cutter,1}$, $Z_2$) of the y-axis linear translation stage 92. Then, move the z-axis linear translation stage 93, and the real-time speckle image acquired by the second speckle image sensor 4 connected to the z-axis linear translation stage 93 is compared with the speckle image at ($X_{cutter}$, $Y_{cutter,1}$, $Z_2$) using the image matching and positioning technique according to SIFT to move the z-axis linear translation stage 93 to the position of $Y_{cutter,1}$ (the positioning error is smaller than the specified system positioning accuracy). Thereafter, move the speckle image positioning point 41 of the second speckle image sensor 4 mounted on the cutter holding unit 95 to the positioning marking of the z-axis work starting point at X=0, $Y=Y_{cutter,1}$, $Z_{cutter,0}=Z_0$. Use a z-axis linear encoder to move the second reflector lens 87 repeatedly by a fixed distance about 20-100 μm for n times. After each time of displacement positioning, the second speckle image sensor 4 acquires the speckle image on the second YZ plane 32 of the second positioning base 3. Total (n+1) speckle images are recorded, and then use the third laser source 84, the third interference lens 85, the third reflector lens 86, and the fourth reflector lens 87 to measure the coordinate displacement amounts of the speckle images along the z-axis. Then, a No. 1 speckle position database (0, $Y_{cutter,1}$, $Z_{cutter,j})_{j=0,1,2\ldots,n}$ is established for the speckle images in the z-axis direction at the position of X=0 and $Y=Y_{cutter,1}$ on the second YZ plane 32. Wherein, the coordinate value of $Z_{cutter,0}$ is $Z_0$, while all other $Z_{cutter,j}$ with j=1, 2, ..., n respectively have a relative displacement value measured by the third laser source 84, the third interference lens 85, the third reflector lens 86, and the fourth reflector lens 87. Therefore, in the speckle position database (0, $Y_{cutter,1}$, $Z_{cutter,j})_{j=0,1,2,\ldots,n}$, there are included (n+1) coordinate speckle images and their corresponding absolute positioning coordinates. Continue the above step to establish a speckle image database of speckle images along z-axis at positions of X=0 and $Y=Y_{cutter,i}$ on the second YZ plane 32. Thereafter, acquire the speckle image at the $i^{th}$ positioning point on the y-axis linear translation stage 92 and move the z-axis linear translation stage 93. And, the real-time speckle image acquired by the second speckle image sensor 4 connected to the z-axis linear translation stage 93 is compared with the speckle image at ($X_{cutter}$, $Y_{cutter,i}$, $Z_2$) using the image matching and positioning technique according to SIFT to move the z-axis linear translation stage 93 to the position of $Y_{cutter,i}$ (the positioning error is smaller than the specified system positioning accuracy). Then, move the speckle image positioning point 41 of the second speckle image sensor 4 mounted on the cutter holding unit 95 to the positioning marking of the z-axis work starting point at X=0, $Y=Y_{cutter,i}$, $Z_{cutter,0}=Z_0$. Use a z-axis linear encoder to move the second reflector lens 87 repeatedly by a fixed distance about 20-100 μm for n times. After each time of displacement positioning, the second speckle image sensor 4 mounted on the cutter holding unit 95 acquires the speckle image on the second YZ plane 32 of the second positioning base 3. Total (n+1) speckle images are recorded, and then use the third laser source 84, the third interference lens 85, the third reflector lens 86, and the fourth reflector lens 87 to measure the coordinate displacement amounts of the speckle images along the z-axis, so as to establish a No. i speckle position database (0, $Y_{cutter,i}$, $Z_{cutter,j})_{j=0,1,2\ldots,n}$ of the speckle images in the z-axis direction at the position of X=0 and $Y=Y_{cutter,i}$ on the second YZ plane 32. Wherein, the coordinate value of $Z_{cutter,0}$ is $Z_0$, while all other $Z_{cutter,j}$ with j=1, 2 ..., n respectively have a relative displacement value measured by the third laser source 84, the third interference lens 85, the third reflector lens 86, and the fourth reflector lens 87. Finally, it is able to complete the establishment of the speckle position database (0, $Y_{cutter,i}$, $Z_{cutter,j})_{i=0,1,2\ldots,n,\ j=0,1,2\ldots n}$ of speckle images on the second YZ plane 32 of the second positioning base 3. According to the above description, the positioning accuracy obtained from the comparison of the real-time speckle images on the second YZ plane 32 of the second positioning base 3 with the speckle position database of speckle images on the second YZ plane 32 of the second positioning base 3 is higher than the positioning accuracy obtained from the y-axis linear encoder and the z-axis linear encoder. What is more important is the positioning accuracy provided by the speckle position database of speckle images on the second YZ plane 32 of the second positioning base 3 will not change due e thermal expansion of the machine tool 9.

Figure 7:
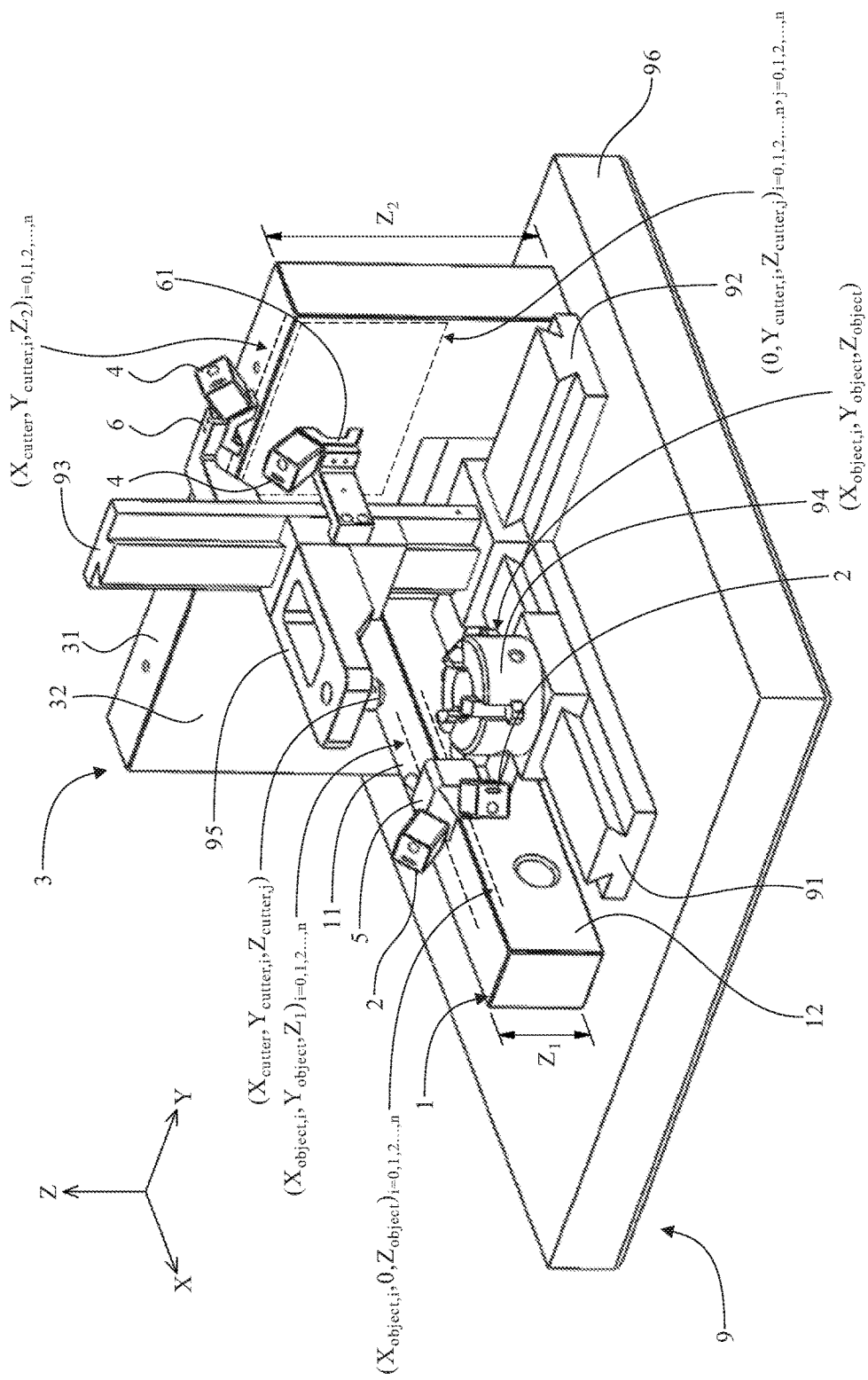
FIG. 7 is a schematic view showing the speckle positions of the object holding unit and the cutter holding unit before the machine tool starts machining, obtained using the measurement, calibration and compensation system and method for machine tool according to the preferred embodiment of the present invention.

Please refer to FIG. 7. By combining the speckle position database of speckle images on the second XY plane 31 of the second positioning base 3 and the speckle position database of speckle images on the second YZ plane 32 of the second positioning base 3, the speckle positions of the cutter holding unit 95 positioned on the second positioning base 3 can be obtained and indicated as ($X_{cutter}$, $Y_{cutter,\ i}$, $Z_{cutter,\ j})_{i=0,1,2\ldots n,\ j=0,1,2\ldots n}$. Wherein, a displacement vector $(\Delta X, \Delta Y)_{Z=Z2,\ 2nd\ XY\ plane}$ is generated after a real-time speckle position at $Z=Z_2$ and the second XY plane 31 is compared with the speckle position database of speckle images on the second XY plane 31 of the second positioning base 3 to provide a displacement amount $\Delta X$ of $X_{cutter}$ and a displacement amount $\Delta Y$ of $Y_{cutter,i}$. Since the cutter holding unit 95 is mounted on the z-axis linear translation stage 93, the position calibration amount $\Delta Y$ of the y-axis linear translation stage 92 is less direct. Therefore, only the calibration amount $\Delta X$ will be adopted. The more direct comparison, positioning and calibration amount $(\Delta Y, \Delta Z)_{X=0,\ 2nd\ YZ\ plane}$ at X=0 and the second YZ, plane 32 will be adopted as an error value $\Delta Y$. A displacement vector $(\Delta Y, \Delta Z)_{X=0,\ 2nd\ YZ\ plane}$ is generated after a real-time speckle position at X=0 and the second YZ plane 32 is compared with the speckle position database of speckle images on the second YZ p 32 of the second positioning base 3 to provide a displacement amount $\Delta Y$ of $Y_{cutter,i}$ and a displacement amount $\Delta Z$ of $Z_{cutter,j}$. The direct use of the speckle position database established via the second YZ plane 32 of the second positioning base 3 for absolute planar positioning will be more direct and more accurate than the use of readings from the x-axis linear encoder and the y-axis linear encoder for positioning.

Figure 8:
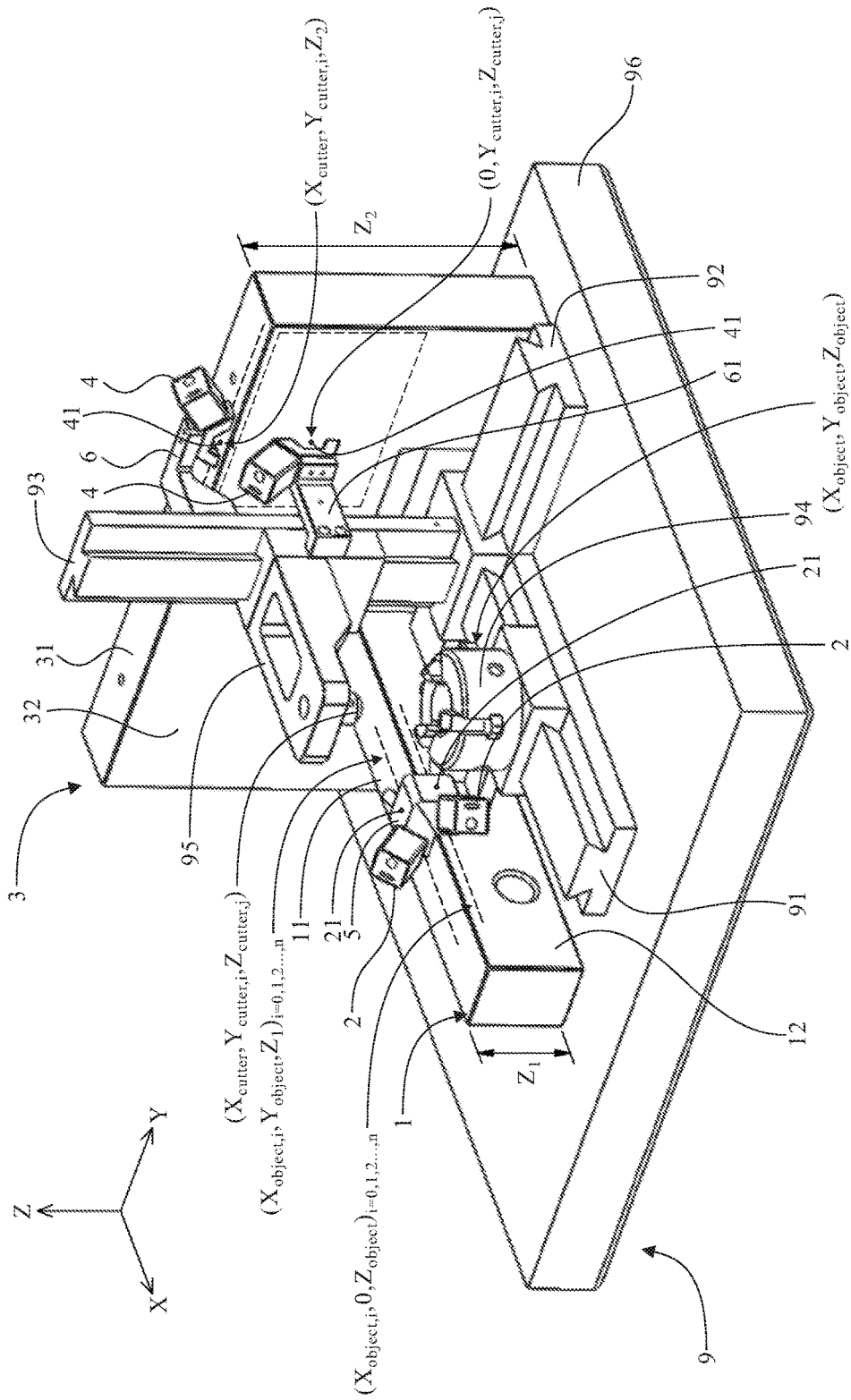
FIG. 8 is a schematic view showing the speckle positions of the object holding unit and the cutter holding unit at specific positions before the machine tool starts machining, obtained using the measurement, calibration and compensation system and method for machine tool according to the preferred embodiment of the present invention.
Figure 9:
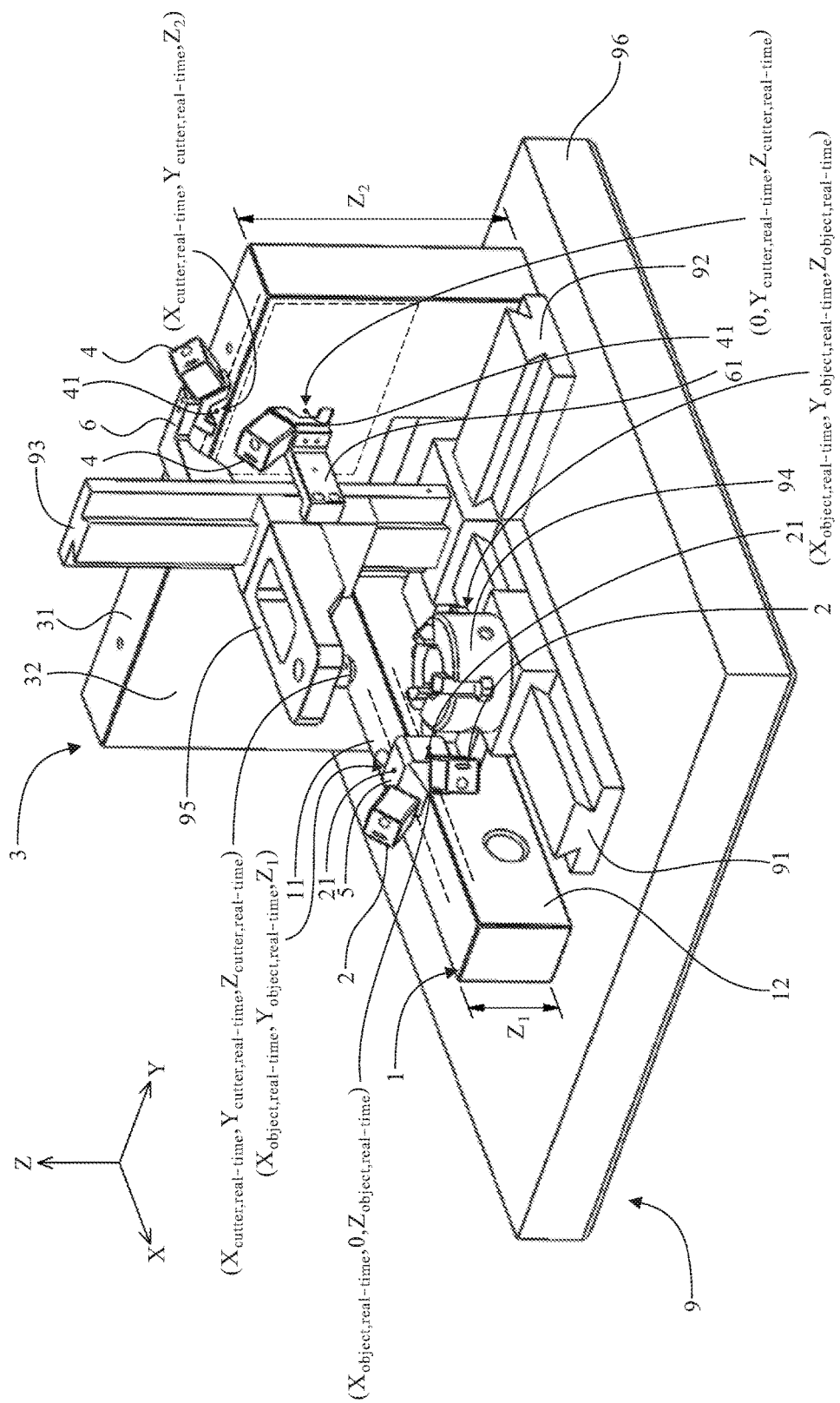
FIG. 9 is a schematic view showing the speckle positions of the object holding unit and the cutter holding unit at specific positions when the machine tool is machining, obtained using the measurement, calibration and compensation system and method for machine tool according to the preferred embodiment of the present invention.

Please refer to FIGS. 8 and 9. The following is a detailed description of the measurement, calibration and compensation method for machine tool according to the present invention. First, the calibration and compensation method for Y=0 and the first XZ plane 12 is considered. When the machine tool 9 is started, a real-time speckle image at Y=0 and the first XZ plane 12 is first captured. The real-time speckle image so captured is compared with all the coordinate speckle images in the speckle image database $(X_{object,i}, 0, Z_{object})_{i=0,1,2\ldots n}$ using the SIFT algorithm, so as to obtain a coordinate speckle image and its speckle position coordinate $(X_{object,i\text{-}closest\ to\ starting\ point}, 0, Z_{object})$ that are closest to the real-time speckle image and also to obtain the displacement information $(\Delta X_{object,i\text{-}closest\ to\ starting\ point}, \Delta Z_{object\text{-}starting\ point})$ of these two speckle images. Therefore, it is able to obtain the absolute speckle position $(X_{object,i\text{-}closest\ to\ starting\ point} + \Delta X_{object,i\text{-}closest\ to\ starting\ point}, 0, Z_{object} + \Delta Z_{object\text{-}starting\ point})$ of the real-time speckle image at Y=0 and the first XZ plane 12 at the time point the machine tool 9 is started. This position is also the absolute coordinates of the object holding unit 94 at Y=0 and the first XZ plane 12 when the machine tool 9 is started and located at the starting point of Y=0 and the first XZ plane 12. Then, the object holding unit 94 starts moving in a programmed manner; and displacement information of the object holding unit 94 is recorded according to the movement of the linear encoder to accumulate the displacement information $\Delta X_{1\ sec}$ of the object holding unit 94 on the x-axis linear translation stage 91 within one second. The selection of 1-second calibration interval can be changed according to the speed of thermal expansion of the machine tool 9 and the positioning accuracy of the machine tool 9. In the illustrated preferred embodiment of the present invention, the thermal expansion calibration time interval for the machine tool 9 is set to one second. The real-time speckle image of the object holding unit 94 at Y=0 and the first XZ plane 12 is read after one second. From the displacement amount $\Delta X_{1\ sec}$ accumulated by the x-axis linear encoder within one second and the x-axis starting point coordinates $(X_{object,i\text{-}closest\ to\ starting\ point} + \Delta X_{object,i\text{-}closest\ to\ starting\ point})$, the predictive positioning coordinates $(X_{object,i\text{-}closest\ to\ starting\ point} + \Delta X_{object,i\text{-}closest\ to\ starting\ point} + \Delta X_{1\ sec}, 0, Z_{object} + \Delta Z_{object\text{-}starting\ point})$ of the x-axis linear encoder after 1 second can be obtained. Thereafter, the database coordinate speckle image $(X_{object,i\text{-}closest\ to\ predictive\ position\text{-}1\ sec}, 0, Z_{object})$ closest to the above predictive position can be acquired. The speckle image at $(X_{object,i\text{-}closest\ to\ predictive\ position\text{-}1\ sec}, 0, Z_{object})$ can be compared with the real-time speckle image after 1 second and positioned using SIFT algorithm to thereby obtain the positioning calibration amount $(\Delta X_{object,i\text{-}closest\ to\ predictive\ position\text{-}1\ sec}, \Delta Z_{object\text{-}1\ sec})$ of the real-time speckle image after 1 second. The predictive positioning speckle position of the object holding unit 94 at Y=0 and the first XZ plane 12 after 1 second is $(X_{object,i\text{-}closest\ to\ starting\ point} + \Delta X_{object,i\text{-}closest\ to\ starting\ point} + \Delta X_{1\ sec}, 0, Z_{object} + \Delta Z_{object\text{-}starting\ point})$. However, the absolute speckle position obtained after the comparison of the real-time speckle image after one second with the speckle image database is $(X_{object,i\text{-}closest\ to\ predictive\ position} + \Delta X_{object,i\text{-}closest\ to\ predictive\ position\text{-}1\ sec}, 0, Z_{object} + \Delta Z_{object\text{-}1\ sec})$. Therefore, it is able to obtain the absolute positioning calibration error $[(X_{object,i\text{-}closest\ to\ predictive\ position\text{-}1\ sec} + \Delta X_{object,i\text{-}closest\ to\ predictive\ position\text{-}1\ sec}) - (X_{object,i\text{-}closest\ to\ starting\ point} + \Delta X_{object,i\text{-}closest\ to\ starting\ point} + \Delta X_{1\ sec}), (Z_{object} + \Delta Z_{object\text{-}1\ sec}) - (Z_{object} + \Delta Z_{object\text{-}starting\ point})]$ of the object holding unit 94 at Y=0 and the first XZ plane 12 after having worked for 1 second. Then, the calibration and compensation method for the object holding unit 94 at $Z=Z_1$ and the first XY plane 11 is considered. When the machine tool 9 is started, a real-time speckle image at $Z=Z_1$ and the first XY plane 11 is first captured. The real-time speckle image so captured is compared with all the coordinate speckle images in the speckle image database $(X_{object,i}, Y_{object}, Z_1)_{i=0,1,2\ldots n}$ using the SIFT algorithm, so as to obtain the coordinate speckle image and its speckle position coordinates $(X_{object,i\text{-}closest\ to\ starting\ point}, Y_{object}, Z_1)$ that are closest to the real-time speckle image and also to obtain the displacement information $(\Delta X_{object,i\text{-}closest\ to\ starting\ point}, \Delta Y_{object\text{-}starting\ point})$ of these two speckle images. Therefore, it is able to obtain the absolute speckle position $(X_{object,i\text{-}closest\ to\ starting\ point} + \Delta X_{object,i\text{-}closest\ to\ starting\ point}, Y_{object} + \Delta Y_{object\text{-}starting\ point}, Z_1)$ of the real-time speckle image at $Z=Z_1$ and the first XY plane 11 at the time point the machine tool 9 is started. This speckle position is also the absolute coordinates of the object holding unit 94 at $Z=Z_1$ and the first XY plane 11 when the machine tool 9 is started and located at the starting point. Then, the x-axis linear translation stage 91 starts moving in a programmed manner; and the movement distance $\Delta X_{1\ sec}$ of the x-axis linear translation stage 91 accumulated within one second is recorded according to the movement of the x-axis linear encoder. The real-time speckle image of the object holding unit 94 at $Z=Z_1$ and the first XY plane 11 is read after one second. From the displacement amount $\Delta X_{1\ sec}$ accumulated by the x-axis linear encoder within one second and the x-axis starting point coordinates $(X_{object,i\text{-}closest\ to\ starting\ point} + \Delta X_{object,i\text{-}closest\ to\ starting\ point})$, the predictive positioning coordinates $(X_{object,i\text{-}closest\ to\ starting\ point} + \Delta X_{object,i\text{-}closest\ to\ starting\ point} + \Delta X_{1\ sec}, Y_{object} + \Delta Y_{object\text{-}starting\ point}, Z_1)$ of the x-axis linear encoder after 1 second can be obtained. Thereafter, the database coordinate speckle image $(X_{object,i\text{-}closest\ to\ predictive\ position\text{-}1\ sec}, Y_{object}, Z_1)$ closest to the above predictive position can be acquired. The speckle image at $(X_{object,i\text{-}closest\ to\ predictive\ position\text{-}1\ sec}, Y_{object}, Z_1)$ can be compared with the real-time speckle image after 1 second and positioned using SIFT algorithm to thereby obtain the positioning calibration amount $(\Delta X_{object,i\text{-}closest\ to\ predictive\ position\text{-}1\ sec}, \Delta Y_{object\text{-}1\ sec})$ of the real-time speckle image after 1 second. The predictive positioning speckle position of the object holding unit 94 at $Z=Z_1$ and the first XY plane 11 is indicated by $(X_{object,i\text{-}closest\ to\ starting\ point} + \Delta X_{object,i\text{-}closest\ to\ starting\ point} + \Delta X_{1\ sec}, Y_{object} + \Delta Y_{object\text{-}starting\ point}, Z_1)$. However, the absolute speckle position obtained after the comparison of the real-time speckle image after one second with the speckle image database is $(X_{object,i\text{-}closest\ to\ theoretical\ position} + \Delta X_{object,i\text{-}closest\ to\ theoretical\ position\text{-}1\ sec}, Y_{object} + \Delta Y_{object\text{-}1\ sec}, Z_1)$. Therefore, it is able to obtain the absolute positioning calibration error $[(X_{object,i\text{-}closest\ to\ predictive\ position\text{-}1\ sec} + \Delta X_{object,i\text{-}closest\ to\ predictive\ position\text{-}1\ sec}) - (X_{object,i\text{-}closest\ to\ starting\ point} + \Delta X_{object,i\text{-}closest\ to\ starting\ point} + \Delta X_{1\ sec}), (Y_{object} + \Delta Y_{object\text{-}1\ sec}) - (Y_{object} + \Delta Y_{object\text{-}starting\ point})]$ of the object holding unit 94 at $Z=Z_1$ and the first XY plane 11 after having worked for 1 second.

At the time the object holding unit 94 has worked for one second, the combined absolute positioning error calibration amount of the two speckle image positioning points 21 relative to the first positioning base 1 is $[(X_{object,i-closest\ to\ predictive\ position-1\ sec} + \Delta X_{object,i-closest\ to\ predictive\ position-1\ sec}) - (X_{object,i-closest\ to\ starting\ point} + \Delta X_{object,i-closest\ to\ starting\ point} + \Delta X_{1\ sec}), (\Delta Y_{object-1\ sec} - \Delta Y_{object-starting\ point}), (\Delta Z_{object-1\ sec} - \Delta Z_{object-starting\ point})]$. According to the above method, after the absolute positioning error calibration amount of the object holding unit 94 is obtained after each one second, the obtained calibration amount is fed back to an axis control system of the machine tool 9 to enable high-precision calibration of the machining accuracy in the x-axis, the y-axis and the z-axis.

Please refer to FIGS. 8 and 9. The following is a detailed description of the measurement, calibration and compensation method for machine tool according to the present invention. First, the calibration and compensation method for the z-axis linear translation stage 93 at $Z=Z_2$ and the second XY plane 31 is considered. When the machine tool 9 is started, a real-time speckle a t $Z=Z_2$ and the second XY plane 31 is first captured. The real-time speckle image so captured is compared with all coordinate speckle images in the speckle image database $(X_{cutter}, Y_{cutter,i}, Z_2)_{i=0,1,2\ldots,n}$ and positioned using the SIFT algorithm, so as to obtain a coordinate speckle image and its speckle position coordinates $(X_{cutter}, Y_{cutter,i-closest\ to\ starting\ point}, Z_2)$ that are closest to the real-time speckle image and also to obtain the displacement information $(\Delta X_{cutter-starting\ point}, \Delta Y_{cutter,i-closest\ to\ starting\ point-XY})$ of these two speckle images. Therefore, it is able to obtain the absolute positioning speckle position $(X_{cutter} + \Delta X_{cutter-starting\ point}, Y_{cutter,i-closest\ to\ starting\ point} + \Delta Y_{cutter,i-closest\ to\ starting\ point-XY}, Z_2)$ of the real-time speckle image at the second positioning base 32. The above position is also the absolute coordinates of the cutter holding unit 95 at $Z=Z_2$ and the second XY plane 31 at the time point the machine tool 9 is started and located at the starting point. Then, the z-axis linear translation stage 93 starts moving in a programmed manner; and the movement distance $\Delta Y_{1\ sec}$ of the z-axis linear translation stage 93 accumulated within one second is recorded according to the movement of the y-axis linear encoder. The real-time speckle image of the z-axis linear translation stage 93 at $Z=Z_2$ and the second XY plane 31 is read after one second. From the displacement amount $\Delta Y_{1\ sec}$ accumulated by the y-axis linear encoder within one second and the y-axis starting point coordinates $(Y_{cutter,i-closest\ to\ starting\ point} + \Delta Y_{cutter,i-closest\ to\ starting\ point-XY})$, predictive positioning coordinates $(X_{cutter} + \Delta X_{cutter-starting\ point}, Y_{cutter,i-closest\ to\ starting\ point} + \Delta Y_{cutter,i-closest\ to\ starting\ point-XY} + \Delta Y_{1\ sec}, Z_2)$ of the cutter holding unit 95 at $Z=Z_2$ and the second XY plane 31 after 1 second can be obtained. Thereafter, the database coordinate speckle image $(X_{cutter}, Y_{cutter-closest\ to\ predictive\ position-1\ sec}, Z_2)$ closest to the above predictive position can be acquired. The database coordinate speckle image at $(X_{cutter}, Y_{cutter-closest\ to\ predictive\ position-1\ sec}, Z_2)$ can be compared with the real-time speckle image after 1 second and positioned using SIFT algorithm to thereby obtain the positioning calibration amount $(\Delta X_{cutter-1\ sec}, \Delta Y_{cutter,i-closest\ to\ predictive\ position-1\ sec})$ of the real-time speckle image after 1 second. The predictive positioning speckle position of the cutter holding unit 95 at $Z=Z_2$ and the second XY plane 31 is indicated by $(X_{cutter} + \Delta X_{cutter-starting\ point}, Y_{cutter,i-closest\ to\ starting\ point} + \Delta Y_{cutter,i-closest\ to\ starting\ point-XY} + \Delta Y_{1\ sec}, Z_2)$. However, the absolute speckle position obtained after the comparison of the real-time speckle image after one second with the speckle image database is $X_{cutter} + \Delta X_{cutter-1\ sec}, Y_{cutter-closest\ to\ predictive\ position-1\ sec} + \Delta Y_{cutter-closest\ to\ predictive\ position-1\ sec}, Z_2)$. Therefore, it is able to obtain the absolute positioning calibration error $[(\Delta X_{cutter-1\ sec} - \Delta X_{cutter-starting\ point}), (Y_{cutter-closest\ to\ predictive\ position-1\ sec} + \Delta Y_{cutter-closest\ to\ predictive\ position-1\ sec}) - (Y_{cutter,i-closest\ to\ starting\ point} + \Delta Y_{cutter,i-closest\ to\ starting\ point-XY} + \Delta Y_{1\ sec})]$ of the cutter holding unit 95 at $Z=Z_2$ and the second XY plane 31 after having worked for 1 second. Then, the calibration and compensation method for the z-axis linear translation stage 93 at X=0 and the second YZ plane 32 is considered. Since the movement of the cutter holding unit 95 is a two-dimensional motion in the y-axis and the z-axis, it is necessary to compare the speckle coordinate image on the second YZ plane 32 with the real-time speckle image of the cutter holding unit 95 at X=0 and the second YZ plane 32 to obtain the real-time absolute positioning coordinates of the cutter holding unit 95. To enable effective and quick acquiring of the real-time speckle images at X=0 and the second YZ plane 32 as well as the closest speckle coordinate image in the database for calibration, comparison and positioning, an absolute positioning of the speckle image is first performed for the y-axis position. Then, locate the z-axis speckle image database of the second YZ plane 32 that is closest to the y-axis coordinate position. Use the matching method according to the SIFT algorithm to perform real-time speckle image absolute positioning for all the speckle coordinate images in the database and the real-time speckle images captured at X=0 and the second YZ plane 32. More specifically, when the machine tool 9 is started, the two second speckle image sensors 4 mounted on the z-axis linear translation stage 93 and the cutter holding unit 95 will capture a real-time speckle image at $Z=Z_2$ and the second XY plane 31 and a real-time speckle image at X=0 and the second YZ plane 32, respectively. First, use the SIFT to compare the real-time speckle image captured at $Z=Z_2$, and the second XY plane 31 with all the coordinate speckle images in the speckle position database $(X_{cutter}, Y_{cutter,i}, Z_2)_{i=0,1,2,\ldots,n}$ for the purpose of positioning, so as to obtain the coordinate speckle image and its speckle position coordinate $(X_{cutter}, Y_{cutter,i-closest\ to\ starting\ point}, Z_2)$ that are closest to the real-time speckle image and also to obtain the displacement amount $(\Delta_{Xcutter-starting\ point}, \Delta Y_{cutter,i-closest\ starting\ point-XY})$ of these two speckle images. After the y-axis positioning information $Y_{cutter,i-closest\ to\ starting\ point}$ is obtained, all the speckle images in the database $(0, Y_{cutter,i-closest\ to\ starting\ point}, Z_{cutter,j})_{j=0,1,2,\ldots,n}$ in the speckle position database $(0, Y_{cutter,i}, Z_{cutter,j})_{i=0,1,2,\ldots,n\ j=0,1,2,\ldots,n}$ at X=0 and the second YZ, plane 32 are immediately retrieved. Use e SIFT to compare the real-time speckle image captured at X=0 and the second YZ plane 32 with all speckle images in the speckle position database $(0, Y_{cutter,i-closest\ to\ starting\ point}, Z_{cutter,j})_{j=0,1,2,\ldots,n}$ for the purpose of positioning, in order to obtain the coordinate speckle image and its speckle position coordinates $(0, Y_{cutter,i-closest\ to\ starting\ point}, Z_{cutter,j-closest\ to\ starting\ point})$ that are closest to the real-time speckle image and also to obtain the displacement amount $(\Delta Y_{cutter,i-closest\ to\ starting\ point-YZ}, \Delta Z_{cutter,j-closest\ to\ starting\ point})$ of these two speckle images. Theoretically, the y-axis calibration error $\Delta Y_{cutter,i-closest\ to\ starting\ point-XY}$ of the real-time speckle at $Z=Z_2$ and the second XY plane 31 and the y-axis calibration error $\Delta Y_{cutter,i-closest\ to\ starting\ point-YZ}$ of the real-time speckle at X=0 and the second YZ plane 32 should be the same (or smaller than the specified system positioning accuracy. In the event there is a significant difference between the above two y-axis calibration errors, a mean of the two calibration amounts, i.e. ($\Delta Y_{cutter,i-closest\ to\ starting\ point}$=0.5×($\Delta Y_{cutter,i-closest\ to\ starting\ point-XY}$+$\Delta Y_{cutter,i-closest\ to\ starting\ point-YZ}$)). From the above steps, it is able to obtain the absolute positioning coordinates (0, $Y_{cutter,i-closest\ to\ starting\ point}$+$\Delta Y_{cutter,i-closest\ to\ starting\ point}$, $Z_{cutter,j-closest\ to\ starting\ point}$+$\Delta Z_{cutter,j-closest\ to\ starting\ point}$), at where the real-time speckle at X=0 and the second YZ plane 32 is positioned on the second YZ plane 32 at the time the machine tool 9 is started. Thereafter, the cutter holding unit 95 and the z-axis linear translation stage 93 start moving in a programmed manner. The movement distance $\Delta Y_{1\ sec}$ of the z-axis linear translation stage 93 and the movement distance $\Delta Z_{1\ sec}$ of the cutter holding unit 95 accumulated within one second are separately recorded according to the movement of the y-axis linear encoder and the movement of the z-axis linear encoder. The real-time speckle image at Z=$Z_2$ and the second XY plane 31 and the real-time speckle image at X=0 and the second YZ plane 32 are read after one second. At X=0 and the second YZ plane 32, use the displacement amount $\Delta Z_{1\ sec}$ of the z-axis linear encoder accumulated within one second and the z-axis starting point coordinates ($Z_{cutter,j-closest\ to\ starting\ point}$+$\Delta Z_{cutter,j-closest\ to\ starting\ point}$) to obtain the predictive positioning coordinates (0, $Y_{cutter,i-closest\ to\ starting\ point}$+$\Delta Y_{cutter,i-closest\ to\ starting\ point-YZ}$+$\Delta Y_{1\ sec}$, $Z_{cutter,j-closest\ to\ starting\ point}$+$\Delta Z_{cutter,j-closest\ to\ starting\ point}$+$\Delta Z_{1\ sec}$) of the z-axis linear encoder after one second. Then, the speckle (0, $Y_{cutter-i-closest\ to\ predictive\ position-1\ sec}$, $Z_{cutter-j-closest\ to\ predictive\ position-1\ sec}$) that is closest to the aforesaid predictive position is retrieved and compared with the real-time speckle image at X=0 and the second YZ plane 32 after one second using the SIFT algorithm, so as to obtain the positioning calibration amount ($\Delta Y_{cutter,i-closest\ to\ predictive\ position-1\ sec-YZ}$, $\Delta Z_{cutter-j-closest\ to\ predictive\ position-1\ sec}$) for the real-time speckle image after one second. The positioning coordinates of the predictive position of the cutter holding unit 95 after one second is (0, $Y_{cutter,i-closest\ to\ starting\ point}$+$\Delta Y_{cutter,i-closest\ to\ starting\ point-YZ}$+$\Delta Y_{1\ sec}$, $Z_{cutter,j-closest\ to\ starting\ point}$+$\Delta Z_{cutter,j-closest\ to\ starting\ point}$+$\Delta Z_{1\ sec}$), but the absolute coordinates of the real-time speckle image compared with the images in the speckle position database and positioned after one second is (0, $Y_{cutter-closest\ to\ predictive\ position-1\ sec}$+$\Delta Y_{cutter-closest\ to\ predictive\ position-1\ sec-YZ}$, $Z_{cutter-j-closest\ to\ predictive\ position-1\ sec}$+$\Delta Z_{cutter-j-closest\ predictive\ position-1\ sec}$). Therefore, it is able to obtain the absolute positioning calibration error [($Y_{cutter-i-closest\ to\ predictive\ position-1\ sec}$+$\Delta Y_{cutter-i-closest\ to\ predictive\ position-1\ sec-YZ}$)−($Y_{cutter,i-closest\ to\ starting\ point}$+$\Delta Y_{cutter,i-closest\ to\ starting\ point-YZ}$+$\Delta Y_{1\ sec}$), ($Z_{cutter-j-closest\ to\ predictive\ position-1\ sec}$+$\Delta Z_{cutter-j-closest\ to\ predictive\ position-1\ sec}$)−($Z_{cutter,j-closest\ to\ starting\ point}$+$\Delta Z_{cutter,j-closest\ to\ starting\ point}$+$Z_{1\ sec}$)] of the z-axis linear encoder at X=0 and the second YZ plane 32 after having worked for 1 second. Theoretically, the y-axis calibration error [($Y_{cutter-closest\ to\ predictive\ position-1\ sec}$+$\Delta Y_{cutter-closest\ to\ predictive\ position-1\ sec-XY}$)−($Y_{cutter,i-closest\ to\ starting\ point}$+$\Delta Y_{cutter,i-closest\ to\ starting\ point-XY}$+$\Delta Y_{1\ sec}$)] of the real-time speckle image at Z=$Z_2$ and the second XY plane 31 after one second and the y-axis calibration error [($Y_{cutter-i-closest\ to\ predictive\ position-1\ sec}$+$\Delta Y_{cutter-i-closest\ to\ predictive\ position-1\ sec-YZ}$)−($Y_{cutter,i-closest\ to\ starting\ point}$+$\Delta Y_{cutter,i-closest\ to\ starting\ point-YZ}$+$\Delta Y_{1\ sec}$)] of the real-time speckle image at X=0 and the second YZ plane 32 after one second should be the same (or smaller than the specified system positioning accuracy. In the event there is a significant difference between the above two y-axis calibration errors, the calibration error value [($Y_{cutter-i-closest\ to\ predictive\ position-1\ sec}$+$\Delta Y_{cutter-i-closest\ to\ predictive\ position-1\ sec-YZ}$)−($Y_{cutter,i-closest\ to\ starting\ point}$+$\Delta Y_{cutter,i-closest\ to\ starting\ point-YZ}$+$\Delta Y_{1\ sec}$)] at X=0 and the second YZ plane 32 can be adopted. From the above steps, it is able to obtain the absolute positioning coordinates (0, $Y_{cutter-closest\ to\ predictive\ position-1\ sec}$+$\Delta Y_{cutter-closest\ to\ predictive\ position-1\ sec-YZ}$, $Z_{cutter-j-closest\ to\ predictive\ position-1\ sec}$+$\Delta Z_{cutter-j-closest\ to\ predictive\ position-1\ sec}$), at where the real-time speckle image at X=0 and the second YZ plane 32 is positioned at the second YZ plane 32 after one second. At the time the cutter holding unit 95 has worked for one second, the combined absolute positioning error calibration amount of the speckle image positioning point 41 of the cutter holding unit 95 and the speckle a e positioning point 41 of the z-axis linear translation stage 93 relative to the second positioning base 3 is [($\Delta X_{cutter-1\ sec}$−$\Delta X_{cutter-starting\ point}$), ($Y_{cutter-closest\ to\ predictive\ position-1\ sec}$+$\Delta Y_{cutter-closest\ to\ predictive\ position-1\ sec}$)−($Y_{cutter,i-closest\ to\ starting\ point}$+$\Delta Y_{cutter-closest\ to\ starting\ point}$+$\Delta Y_{1\ sec}$), ($Z_{cutter-j-closest\ to\ predictive\ position-1\ sec}$+$\Delta Z_{cutter-j-closest\ to\ predictive\ position-1\ sec}$)−($Z_{cutter,j-closest\ to\ starting\ point}$+$\Delta Z_{cutter,j-closest\ to\ starting\ point}$+$\Delta Z_{1\ sec}$). According to the above method, after the absolute positioning error calibration amount of the cutter holding unit 95 is obtained after each one second, the obtained calibration amount is fed back to the axis control system of the machine tool 9 to enable high-precision calibration of the machining accuracy in the x-axis, the y-axis and the z-axis.

Generally, the linear translation stages of the multi-axis machine tool are mounted on the machine bed, and the linear encoders, the object holding unit and the cutter holding unit are mounted on the near translation stages. Due to the thermal expansion of the machine tool, relative thermal drift error amounts will occur on the linear translation stages that are mounted on the machine tool and extended in different axis directions. These relative thermal drift error amounts are not correctable or readable by the linear encoders. Due to the relative thermal drift error amounts that are caused by the thermal expansion of the machine tool and are not correctable, the machining accuracy of the object holding unit and the cutter holding unit is seriously affected. However, according to the present invention, positioning bases with low expansion coefficient are mounted on the machine bed of the multi-axis machine tool. By taking advantage of the low-thermal-variation feature and the highly stable rigidity of these positioning bases, a calibration and compensation system that does not change with temperature is provided. In addition, in the present invention, the absolute positioning coordinates of the object holding unit and the cutter holding unit on this calibration and compensation system are read from time to time and fed back to the axis control unit of the machine tool to enable precision machining.

According to the existing thermal deformation compensation techniques, the temperature change of the machine tool is first measured, and then the thermal deformation amount of the machine tool is calculated. However, according to the present invention, the thermal expansion amounts in different axial directions of the machine tool can be directly and precisely measured to frequently calibrate the absolute positioning coordinates of each and all axes of the machine tool, so that the multi-axis positioning accuracy would not reduce due to the thermal expansion of the machine tool. With the present invention, the positioning accuracy of machining centers, turning and milling centers and multi-axis machine tools can be improved from the current 15~20 µm to 1~5 µm to largely upgrade the machining quality of machine tools.

The present invention has been described with a preferred embodiment thereof and it is understood that the preferred embodiment is only illustrative and not intended to limit the present invention in any way and many changes and modifications in the described embodiment can be carried out without departing from the scope and the spirit of the invention that is intended to be limited only by the appended claims.

What is claimed is:

1. A measurement, calibration and compensation system for a machine tool, comprising:
   a first positioning base having a first XY plane and a first XZ plane, wherein the first positioning base is for mounting on a machine bed of the machine tool and located at a lateral side of an x-axis linear translation stage of the machine tool, the x-axis linear translation stage is mounted on the machine bed, and the first positioning base is made of a material selected from a group consisting of a zero-expansion glass material, an Invar material, and a granite material;
   two first speckle image sensors for mounting on an object holding unit of the machine tool, wherein the object holding unit is translatable on the x-axis linear translation stage along the x-axis, the first speckle image sensors separately sense along the x-axis a speckle position of the object holding unit at the first XY plane and a speckle position of the object holding unit at the first XZ plane before and after the machine tool is started, and a difference between the speckle positions of the object holding unit at the first XY plane before and after the machine tool is started and a difference between the speckle positions of the object holding unit at the first XZ plane before and after the machine tool is started are used for calibrating and compensating a position of the object holding unit by an axis control system when the machine tool is machining;
   a second positioning base having a second XY plane and a second YZ plane, wherein the second positioning base is provided for mounting on the machine bed of the machine tool and located at a lateral side of a y-axis linear translation stage and a z-axis linear translation stage of the machine tool, the y-axis linear translation stage is mounted on the machine bed, and the z-axis linear translation stage is translatable on the y-axis linear translation stage along the y-axis and the second positioning base is made of a material selected from the group consisting of a zero-expansion glass material, an Invar material, and a granite material; and
   two second speckle image sensors, separately mounting on a cutter holding unit and the z-axis linear translation stage of the machine tool, wherein the cutter holding unit is translatable on the z-axis linear translation stage along the z-axis, one of the two second speckle image sensors senses a speckle position of the cutter holding unit along the y-axis at the second XY plane before and after the machine tool is started for machining, the other second speckle image sensor senses a speckle position of the cutter holding unit along the Z axis at the second YZ plane before and after the machine tool is started, and a difference between the speckle positions of the cutter holding unit at the second XY plane before and after the machine tool is started and a difference between the speckle positions of the cutter holding unit at the second YZ plane before and after the machine tool is started are used calibrating and compensating a position of the cutter holding unit by the axis control system when the machine tool is machining.

2. The measurement, calibration and compensation system for machine tool as claimed in claim 1, further comprising a first adjustment bracket, a second adjustment bracket and a third adjustment bracket; the first speckle image sensors being mounted to the object holding unit of the machine tool via the first adjustment bracket; and the second speckle image sensors being mounted to the z-axis linear translation stage and the cutter holding unit of the machine tool via the third and the fourth adjustment bracket, respectively.

3. The measurement, calibration and compensation system for machine tool as claimed in claim 2, further comprising a first laser source, a first interference lens and a first reflector lens; the first interference lens being mounted on the first positioning base, the first reflector lens being mounted on the first adjustment bracket, and a laser beam emitted by the first laser source being projected onto the first reflector lens via the first interference lens; whereby the first speckle image sensors can sense the speckle position of the object holding unit at the first XY plane and the speckle position of the object holding unit at the first XZ plane before the machine tool is started for machining.

4. The measurement, calibration and compensation system for machine tool as claimed in claim 2, further comprising a second laser source, a second interference lens and a second reflector lens; the second interference lens being mounted on the second positioning base, the second reflector lens being mounted on the second adjustment bracket that is mounted on the z-axis linear translation stage, and a laser beam emitted by the second laser source being projected onto the second reflector lens via the second interference lens; whereby the second speckle image sensor can sense the speckle position of the tool holding unit at the second XY plane before the machine tool is started for machining.

5. The measurement, calibration and compensation system for machine tool as claimed in claim 2, further comprising a third laser source, a third interference lens, a third reflector lens, and a fourth reflector lens; the third interference lens being mounted on the machine bed of the machine tool, the third and the fourth reflector lens being respectively mounted on the z-axis linear translation stage and the third adjustment bracket that is mounted on the cutter holding unit, and a laser beam emitted by the third laser source being projected onto the fourth reflector lens on the third adjustment bracket via the third interference lens and the third reflector lens on the z-axis linear translation stage; whereby the second speckle image sensor can sense the speckle position of the tool holding unit at the second YZ plane before the machine tool is started for machining.

6. A measurement, calibration and compensation method for a machine tool, comprising the following steps:
   (1) before starting the machine tool for machining, separately sensing along an x-axis by two first speckle image sensors a speckle position of an object holding unit of the machine tool at a first XY plane of a first positioning base and a speckle position of the object holding unit at a first XZ plane of the first positioning base, and separately sensing by two second speckle image sensors a speckle position of a cutter holding unit of the machine tool along a y-axis at a second XY plane of a second positioning base and sensing a speckle position of the cutter holding unit along a Z axis at a second YZ plane of the second positioning base, wherein the first positioning base is mounting on a machine bed of the machine tool and located at a lateral side of an x-axis linear translation stage of the machine tool, the x-axis linear translation stage is mounted on the machine bed, the first positioning base is made of a material selected from a group consisting of a zero-expansion glass material, an Invar material, and a granite material, the first speckle image sensors are mounting on the object holding unit of the machine tool, the object holding unit is translatable on the x-axis linear translation stage along the x-axis, the second positioning base is mounting on the machine bed of the machine tool and located at a lateral side of a y-axis linear translation stage and a z-axis linear translation stage of the machine tool, the y-axis linear translation stage is mounted on the machine bed, and the z-axis linear translation stage is translatable on the y-axis linear translation stage along the y-axis, and the second positioning base is made of a material selected from the group consisting of a zero-expansion glass material, an Invar material, and a granite material, the second speckle image sensors are provided for separately mounting on the cutter holding unit and the z-axis linear translation stage of the machine tool, and the cutter holding unit is translatable on the z-axis linear translation stage along the z-axis;

(2) after starting the machine tool for machining, sensing separately along the x-axis by the first speckle image sensors a speckle position of the object holding unit of the machine tool at the first XY plane of the first positioning base and a speckle position of the object holding unit at the first XZ plane of the first positioning base, and sensing separately by the second speckle image sensors a speckle position of the cutter holding unit of the machine tool along the y-axis at the second XY plane of the second positioning base and sensing a speckle position of the cutter holding unit along the z axis at the second YZ plane of the second positioning base;

(3) calibrating and compensating a position of the object holding unit when the machine tool is machining by an axis control system using a difference between the speckle positions of the object holding unit at the first XY plane before and after the machine tool is started and a difference between the speckle positions of the object holding unit at the first XZ plane before and after the machine tool is started; and (4) calibrating and compensating a position of the cutter holding unit when the machine tool is machining by the axis control system using a difference between the speckle positions of the cutter holding unit at the second XY plane before and after the machine tool is started and a difference between the speckle positions of the cutter holding unit at the second YZ plane before and after the machine tool is started.

7. The measurement, calibration and compensation method for machine tool as claimed in claim 6, further comprising a first adjustment bracket, a second adjustment bracket and a third adjustment bracket; the first speckle image sensors being mounted to the object holding unit of the machine tool via the first adjustment bracket; and the second speckle image sensors being mounted to the z-axis linear translation stage and the cutter holding unit of the machine tool via the second and the third adjustment bracket, respectively.

8. The measurement, calibration and compensation method for machine tool as claimed in claim 7, wherein, the measurement, calibration and compensation system for machine tool in the step (1) further includes a first laser source, a first interference lens and a first reflector lens; the first interference lens being mounted on the first positioning base, the first reflector lens being mounted on the first adjustment bracket, and a laser beam emitted by the first laser source being projected onto the first reflector lens via the first interference lens; whereby the first speckle image sensors can sense the speckle position of the object holding unit at the first XY plane and the speckle position of the object holding unit at the first XZ plane before the machine tool is started.

9. The measurement, calibration and compensation method for machine tool as claimed in claim 7, wherein, the measurement, calibration and compensation system for machine tool in the step (1) further includes a second laser source, a second interference lens and a second reflector lens; the second interference lens being mounted on the second positioning base, the second reflector lens being mounted on the second adjustment bracket that is mounted on the z-axis linear translation stage, and a laser beam emitted by the second laser source being projected onto the second reflector lens via the second interference lens; whereby the second speckle image sensor can sense the speckle position of the tool holding unit at the second XY plane before the machine tool is started.

10. The measurement, calibration and compensation method for machine tool as claimed in claim 7, wherein, the measurement, calibration and compensation system for machine tool in the step (1) further includes a third laser source, a third interference lens, a third reflector lens and a fourth reflector lens; the third interference lens being mounted on the machine bed of the machine tool, the third and the fourth reflector lens being respectively mounted on the z-axis linear translation stage and the third adjustment bracket that is mounted on the cutter holding unit, and a laser beam emitted by the third laser source being projected onto the fourth reflector lens on the third adjustment bracket via the third interference lens and the third reflector lens on the z-axis linear translation stage; whereby the second speckle image sensor can sense the speckle position of the tool holding unit at the second YZ plane before the machine tool is started for machining.

\* \* \* \* \*